United States Patent
Greene

(10) Patent No.: US 10,667,372 B2
(45) Date of Patent: May 26, 2020

(54) LIGHTING SYSTEM

(71) Applicant: GG TECH PRODUCTS CO., LIMITED, Wanchai (HK)

(72) Inventor: Ralph Gregory Greene, Dalton, GA (US)

(73) Assignee: GG TECH PRODUCTS CO., LIMITED, Hong Kong (HK)

( * ) Notice: Subject to any disclaimer, the term of this patent is extended or adjusted under 35 U.S.C. 154(b) by 0 days.

(21) Appl. No.: 16/277,043

(22) Filed: Feb. 15, 2019

(65) Prior Publication Data

US 2019/0182941 A1    Jun. 13, 2019

Related U.S. Application Data

(63) Continuation-in-part of application No. 15/812,216, filed on Nov. 14, 2017, now Pat. No. 10,225,912, which is a continuation of application No. 15/170,980, filed on Jun. 2, 2016, now Pat. No. 10,009,981.

(60) Provisional application No. 62/170,091, filed on Jun. 2, 2015.

(51) Int. Cl.
| | |
|---|---|
| *H05B 37/02* | (2006.01) |
| *H05B 39/04* | (2006.01) |
| *H05B 41/36* | (2006.01) |
| *H05B 47/19* | (2020.01) |
| *H05B 47/11* | (2020.01) |
| *H05B 47/105* | (2020.01) |
| *H05B 47/155* | (2020.01) |
| *H05B 47/185* | (2020.01) |

(52) U.S. Cl.
CPC .......... *H05B 47/19* (2020.01); *H05B 47/105* (2020.01); *H05B 47/11* (2020.01); *H05B 47/155* (2020.01); *H05B 47/185* (2020.01)

(58) Field of Classification Search
None
See application file for complete search history.

(56) References Cited

U.S. PATENT DOCUMENTS

| | | | |
|---|---|---|---|
| 5,895,985 A | 4/1999 | Fischer et al. | |
| 8,644,998 B2 | 2/2014 | Nerone et al. | |
| 8,853,950 B1 | 10/2014 | Chang et al. | |
| 2011/0062888 A1* | 3/2011 | Bondy | H05B 33/0815 315/294 |

(Continued)

*Primary Examiner* — Anh Q Tran
(74) *Attorney, Agent, or Firm* — Patentfile, LLC; Bradley C. Fach; Steven R. Kick

(57) ABSTRACT

A system for selectively interrupting the power supply of lighting elements may include one or more lighting elements, motion sensors, and a microcontroller for running a lighting program. In some embodiments, the lighting program may be configured to: determine a dusk time period and determining a dawn time period; create a night period between the dusk time period and the dawn time period in which the night period may be divided into at least a first nighttime period and a second nighttime period; run a first set function program during the first nighttime period; and run a second set function program during the second nighttime period, the second set function program causing the lighting element to function differently during the second nighttime period than during the first nighttime period.

9 Claims, 21 Drawing Sheets

(56) References Cited

U.S. PATENT DOCUMENTS

| | | | |
|---|---|---|---|
| 2012/0262069 A1* | 10/2012 | Reed | H05B 37/0218 |
| | | | 315/130 |
| 2012/0293076 A1* | 11/2012 | Drake | F21V 23/0442 |
| | | | 315/152 |
| 2014/0265918 A1 | 9/2014 | Cummings et al. | |
| 2015/0054341 A1 | 2/2015 | Holder et al. | |
| 2015/0054413 A1* | 2/2015 | Chen | H05B 37/0227 |
| | | | 315/155 |
| 2016/0065004 A1 | 3/2016 | Fritsch et al. | |

* cited by examiner

LIGHTING SYSTEM

CROSS REFERENCE TO RELATED APPLICATIONS

This application is a continuation in part application of U.S. application Ser. No. 15/812,216, filed on Nov. 17, 2017, entitled "SYSTEM AND APPARATUS FOR SELECTIVELY INTERRUPTING A POWER SUPPLY", which is a continuation of application of U.S. Non-Provisional application Ser. No. 15/170,980, filed on Jun. 2, 2016, entitled "SYSTEM AND APPARATUS FOR SELECTIVELY INTERRUPTING A POWER SUPPLY", which claims priority to and the benefit of the filing date of U.S. Provisional Application No. 62/170,091, filed on Jun. 2, 2015, entitled "Power Interrupt Adapter for Motion Security Lighting Control", which are hereby incorporated by reference in their entirety.

FIELD OF THE INVENTION

This patent specification relates to the field of security lighting. More specifically, this patent specification relates to a system and apparatus for modulating the functions of security lighting such as motion activated security lighting.

BACKGROUND OF THE INVENTION

Exterior Lighting on homes and businesses which is also known as "flood lighting" is widely used for security purposes and for general lighting of the surrounding outside areas. It is common and useful for multiple exterior security floodlights to be wired on one circuit and controlled by one or more wired wall switches located in convenient locations inside a home. There are many different types and models of motion controlled exterior security lighting which are made for different locations on a building or home. Some models are made for corner locations, some for porch or garage locations, some for side wall or inset lighting, etc.

Another type of exterior security lighting is known as a motion sensor controlled security lighting, which as its name implies, is a floodlight that is controlled by a motion sensor to provide added security and in addition can use much less power as compared with standard floodlights. These motion security lights typically include an exterior flood light fixture with one or more lighting heads that is activated by a motion sensor(s). This type of exterior security lighting can also be known as: motion sensor controlled security light; motion activated floodlight; floodlight with motion sensor; motion activated floodlight; motion sensor floodlight; and the like.

Motion sensor controlled security lighting is widely used on for exterior lighting on homes and businesses to provide general lighting, added security and to save power usage. Motion controlled lighting is generally wired to an interior wall switch and the power remains ON so that the motion sensor always has power and can activate the lighting whenever motion has detected within the motion sensors working zone.

Many motion sensor controlled and non-motion controlled exterior floodlighting fixtures also incorporate a daylight sensor so that the lighting can only be activated during the dusk to dawn time period or when the ambient light level is low. The daylight (ambient) light sensor is usually adjustable so that the lighting level may be set appropriately for the location and use of the lighting fixture. Compared with non-motion sensor controlled exterior lighting fixtures which typically operate from dusk to dawn continuously, motion controlled exterior lighting fixtures will use much less electrical power by operating only when activated by the motion sensor.

While many motion sensor controlled exterior floodlighting fixtures exist, they are limited in functionality. For example, current motion sensor controlled exterior floodlighting fixtures simply turn on for a set time period when motion is detected and then they turn off. Typically, they utilize a light sensor so that they do not turn on during daylight hours. Unfortunately, these types of fixtures having a light sensor can be defeated by shining a beam of light onto the light sensor which in turn disables the motion activating feature. Outdoor motion security lights are used for both general lighting and for security. Motion activated lighting is good to bring attention to an area for security but since it stays ON for a short set time, it is not good for general lighting for normal outdoor activities around a home during the early evening times. Thus, the very useful function of being able to use motion controlled lighting fixtures with added security and power saving benefits as general floodlighting cannot be fully utilized.

Therefore, a need exists for novel security lighting systems. There is a further need for novel security lighting systems for modulating the functions of security lighting such as motion activated security lighting. Finally, there exists a need for novel security lighting systems that enable novel functionality of motion controlled security lights.

BRIEF SUMMARY OF THE INVENTION

A new lighting system is described by example herein. The system may include one or more lighting elements, motion sensors, and a microcontroller for running a lighting program. In some embodiments, the lighting program may be configured to: determine a dusk time period and determining a dawn time period; create a night period between the dusk time period and the dawn time period in which the night period may be divided into at least a first nighttime period and a second nighttime period; run a first set function program during the first nighttime period; and run a second set function program during the second nighttime period, the second set function program causing the lighting element to function differently during the second nighttime period than during the first nighttime period.

In further embodiments, a lighting program may be configured to: detect the presence of motion from a motion sensor; and cause a lighting element to flash a first number of instances if the lighting program is running in a first set function program and cause the lighting element to flash a second number of instances if the lighting program is running in a second set function program. Preferably, the first number of instances may not be equal to the second number of instances.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
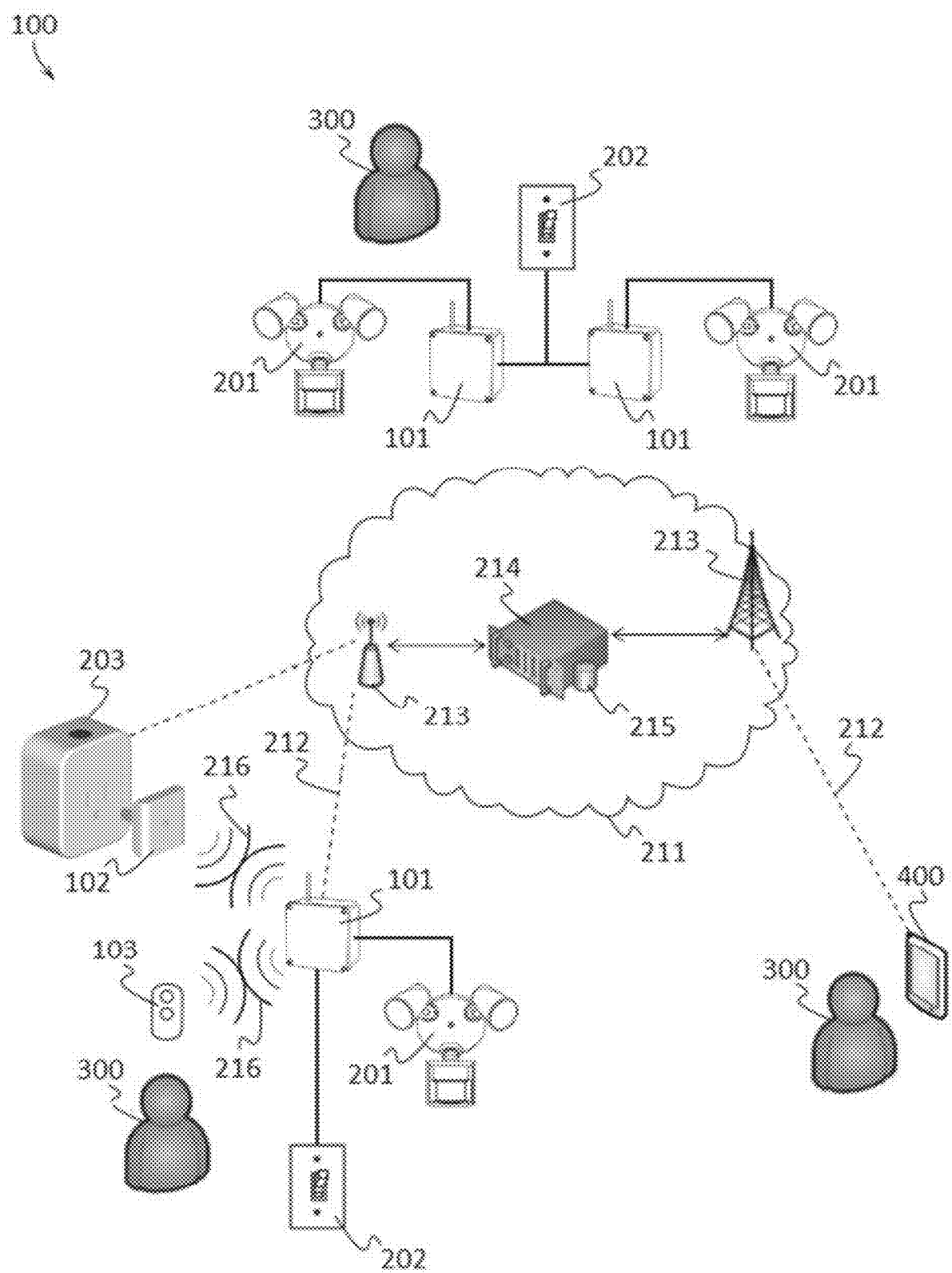
FIG. 1 shows an example of system and apparatuses for selectively interrupting the power supply of lighting elements according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer based on instructions received by computer software.

The term "client device" or sometimes "electronic device" or just "device" as used herein is a type of computer generally operated by a person or user of the system. In some embodiments, a client device is a smartphone or computer configured to receive and transmit data to a server or other electronic device which may be operated locally or in the cloud. Non-limiting examples of client devices include: personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of client devices which are portable and easily carried by a person from one location to another may sometimes be referred to as a "mobile device" or "portable device". Some non-limiting examples of mobile devices include: cell phones, smartphones, tablet computers, laptop computers, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

New systems and apparatuses for modulating the functions of security lighting, such as motion activated security lighting, are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIG. 1 depicts an illustrative example of some of the components and methods which may be found in a system for selectively interrupting the power supply of lighting elements according to various embodiments described herein ("the system") 100 according to various embodiments described herein. In this example and in some embodiments, the system 100 may comprise one or more apparatuses for selectively interrupting the power supply of lighting elements ("the apparatus") 101, with each apparatus 101 in electrical communication with a lighting element 201. A lighting element 201 may comprise any type of light emitting device and preferably may comprise an exterior security lighting device known as a motion security light, which as its name implies, may be a floodlight that is controlled by a motion sensor 71 and configured to provide illumination when the sensor 71 detects motion. Each apparatus 101 may also be in electrical communication with a wall switch 202 which may be modulated from an "on" position to an "off" position. When in the on position, electricity may be provided to the apparatus 101 which may then be communicated to the lighting element 201 and preferably used for the functioning of the lighting element 201. When in the off position, electricity may not be provided to the apparatus 101 and therefore may not be communicated to the lighting element 201. Optionally, an apparatus 101 may be coupled directly to a lighting element 201, or an apparatus 101 may be coupled remotely to a lighting element 201 and wired into electrical communication with the lighting element 201.

Typically, each lighting element 201 may comprise or be configured with one or more status modes which may govern the function of a lighting element 201. In some embodiments, a status mode may include a manual on status mode and an auto on status mode. When in a manual on status mode, a motion security light lighting element 201 may be configured to continuously provide illumination regardless of the presence or absence of motion proximate to the motion sensor 71 of the motion security light lighting element 201. When in an auto on status mode, a motion security light lighting element 201 may be configured to provide illumination for a period of time during or after its respective motion sensor 71 detects motion.

In preferred embodiments, an apparatus 101 may be configured to control or change the status mode of a motion security light lighting element 201 that the apparatus 101 is in electrical communication with in response to a received input sequence 51. In some embodiments, a user 300 may provide an input sequence 51 (FIGS. 5 and 6) to an apparatus 101 by modulating a wall switch 202 which is in electrical communication with the apparatus 101 between an off position and an on position thereby modulating off and on the power in supply 221 (FIG. 2) from the wall switch 202 to the apparatus 101 and therefore the power out supply 222 (FIG. 2) to the motion security light lighting element 201. In this manner, an input sequence 51 may comprise a power off signal and a power on signal, with the power off signal formed by modulating the power in supply 221 off and the power on signal formed by modulating the power supply on. In further embodiments, an input sequence 51 may comprise a first power off signal, a first power on signal, a second power off signal, a second power on signal, and/or any other number of power off signals and/or power on signals.

In further embodiments, the system 100 may comprise a home automation remote 102 which may be in electrical communication with a home automation wall module 203. A home automation wall module 203 may be part of a home automation system which may generally be described as a residential extension of building automation and involves the control and automation of lighting, heating, ventilation, air conditioning (HVAC), appliances, and security. Modern systems generally consist of switches and sensors connected to a central hub sometimes called a "gateway" from which the system is controlled with a user interface that is interacted either with a wall mounted terminal, mobile phone software, tablet computer or a web interface. A home automation wall module 203 may comprise a device having a set of power plugs 61 (FIG. 8) which may be inserted into the power sockets 62 (FIG. 8) of a power outlet thereby connecting the home automation wall module 203 to the primary alternating current (AC) power supply in a building. Additionally, the home automation wall module 203 may comprise a set of power sockets 62 and a control unit which may be configured to enable or disable power to be communicated from the power plugs 61 of the home automation wall module 203 to the power sockets 62 of the home automation wall module 203. Exemplary home automation wall modules 203 include, but are not limited to, iSmartAlarm SP3 Smart Switch; Cooper Wiring Devices RFAPM 600 W Appliance Control Plug-In Module; Belkin WeMo Insight Switch; Panamax SP-1000 BlueBOLT ZigBee SmartPlug; and the like.

In some embodiments, a user 300 may provide an input sequence 51 to an apparatus 101 by enabling or disabling power to be communicated from the power sockets of a home automation wall module 203 to the power plugs of a home automation remote 102. A home automation remote 102 may be in wireless communication, such as by providing a remote signal 216, with an apparatus 101 that is in electrical communication with a motion security light lighting element 201 thereby providing an input sequence 51 to the apparatus 101.

In further embodiments, the system 100 may further comprise an alternate remote 103. An alternate remote 103 may be in wireless communication, such as by providing a remote signal 216, with an apparatus 101 that is in electrical communication with a motion security light lighting element 201. A user 300 modulate a button or other input/output interface of the alternate remote 103 and the alternate remote may provide a radio signal to the apparatus 101 thereby providing an input sequence 51 to the apparatus 101.

In still further embodiments, a user 300 may use a client device 400 to send an input sequence 51 to an apparatus 101. Preferably, an apparatus 101 may be in electrical communication with a wired or wireless network 211 through a network connection 212. A network 211 may comprise a data store 215 and a server 214 which may enable electronic communication through the network 211. A user 300 may use a client device 400 to send an input sequence 51 to an apparatus 101 through the network 211 to which both the client device 400 and apparatus 101 have a network connection 212 to.

Figure 2:
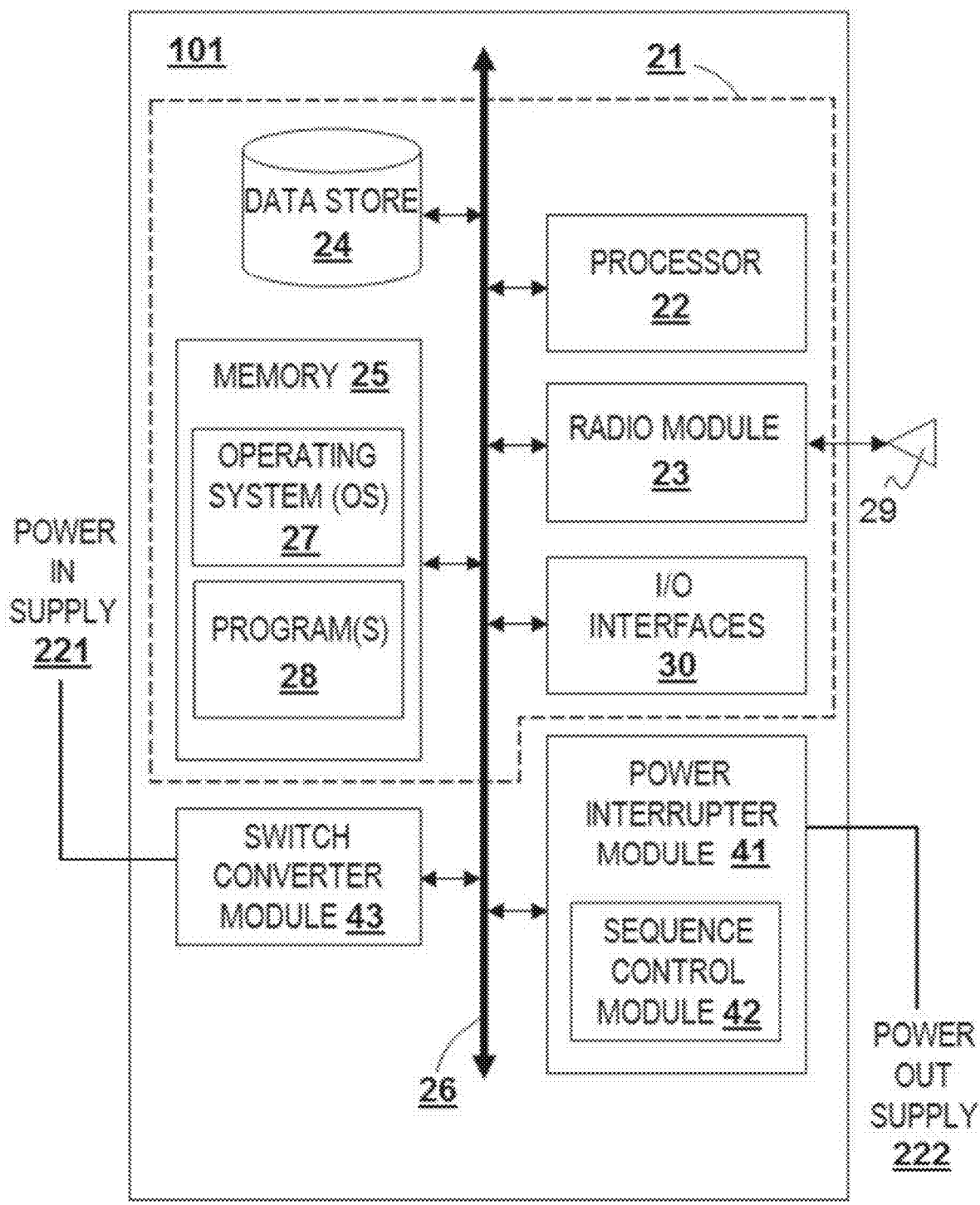
FIG. 2 illustrates a block diagram of one example of an apparatus for selectively interrupting the power supply of lighting elements according to various embodiments described herein.

FIG. 2 illustrates a block diagram showing some of the elements of one example of an apparatus for selectively interrupting the power supply of lighting elements 101 according to various embodiments described herein. In some embodiments and in the present example, the apparatus 101 can be a digital device that, in terms of hardware architecture, comprises a microcontroller 21 which may include a processor 22, input/output (I/O) interfaces 30, a radio module 23, a data store 24, and memory 25. Optionally, the apparatus 101 may include or be in communication with a power interrupter module 41, sequence control module 42, and switch converter module 43. It should be appreciated by those of ordinary skill in the art that FIG. 2 depicts the apparatus 101 in an oversimplified manner, and a practical embodiment may include additional components or elements and suitably configured processing logic to support known or conventional operating features that are not described in detail herein.

The components and elements (22, 30, 23, 24, 25, 41, and 42) are communicatively coupled via a local interface or control board 26. The control board 26 can be, for example but not limited to, one or more buses or other wired or wireless connections, as is known in the art. The control board 26 can have additional elements, which are omitted for simplicity, such as controllers, buffers (caches), drivers, repeaters, and receivers, among many others, to enable communications. Further, the control board 26 may include address, control, and/or data connections to enable appropriate communications among the aforementioned components.

In preferred embodiments, a control board 26 may be an integrated circuit (IC) that integrates one or more components (22, 30, 25, and 34) on a single chip sometimes called a system on a chip (SoC) or system on chip (SOC). In further preferred embodiments, a control board 26 may be a microcontroller (or MCU, short for microcontroller unit) which may be a small computer (SoC) on a single integrated circuit containing a processor 22, memory 25, and programmable input/output interfaces or peripherals 30. Program memory in the form of Ferroelectric RAM, NOR flash or OTP ROM is also often included on chip, as well as a typically small amount of RAM. Microcontrollers are designed for embedded applications, in contrast to the microprocessors used in personal computers or other general purpose applications consisting of various discrete chips. Microcontrollers are used in automatically controlled products and devices, such as automobile engine control systems, implantable medical devices, remote controls, office machines, appliances, power tools, toys and other embedded systems. By reducing the size and cost compared to a design that uses a separate microprocessor, memory, and input/output devices, microcontrollers make it economical to digitally control even more devices and processes. Mixed signal microcontrollers are common, integrating analog components needed to control non-digital electronic systems.

In alternative embodiments, a control board 26 may comprise a printed circuit board (PCB) which mechanically supports and electrically connects electronic components including MCU's using conductive tracks, pads and other features etched from copper sheets laminated onto a non-conductive substrate. PCBs can be single sided (one copper layer), double sided (two copper layers) or multi-layer.

Conductors on different layers may be connected with plated-through holes called vias. In further embodiments, a control board 26 may comprise a printed circuit assembly (PCA), printed circuit board assembly or PCB assembly (PCBA), a circuit card assembly (CCA), or a backplane assembly, or any other suitable electrical connection and communication method including standard wiring and the like.

The processor 22 is a hardware device for executing software instructions. The processor 22 can be any custom made or commercially available processor, a central processing unit (CPU), an auxiliary processor among several processors, a semiconductor-based microprocessor (in the form of a microchip or chip set), or generally any device for executing software instructions. When the processing unit 21 is in operation, the processor 22 is configured to execute software stored within the memory 25, to communicate data to and from the memory 25, and to generally control operations of the apparatus 100 pursuant to the software instructions. In an exemplary embodiment, the processor 22 may include a mobile optimized processor such as optimized for power consumption and mobile applications.

The I/O interfaces 30 can be used to input and/or output information to a user 300 (FIG. 1). In some embodiments, I/O interfaces 30 may include one or more turnable control knobs, depressible button type switches, a key pad, slide type switches, dip switches, rocker type switches, rotary dial switches, numeric input switches or any other suitable input which a user 300 may interact with to provide input. In further embodiments, I/O interfaces 30 may include one or more light emitting elements or other display device, e.g., a LED (light emitting diode) display or LCD (liquid crystal display) monitor, speaker, or any other suitable device for outputting or displaying information. The I/O interfaces 30 can also include, for example, a serial port, a parallel port, a small computer system interface (SCSI), an infrared (IR) interface, a radio frequency (RF) interface, a universal serial bus (USB) interface, and the like.

A radio module 23 enables wireless communication to an external access device or network through an antenna 29. A radio module 23 may comprise a wireless communication receiver and optionally a wireless communication transmitter. In some embodiments, a radio module 23 may operate on a cellular band and may communicate with or receive a Subscriber Identity Module (SIM) card or other wireless network identifier. Any number of suitable wireless data communication protocols, techniques, or methodologies can be supported by the radio module 23, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

In preferred embodiments, the radio module 23 may comprise or include a code hopping encoder designed for secure Remote Keyless Entry (RKE) systems. For example, the radio module 23 may comprise or include a HCS301 RF KeeLoQ Code Hopping Encoder manufactured by Microchip Technology Inc. or the like which may be configured to provide encrypted remote signals, such as with rolling code encryption or any other suitable encryption method.

The data store 24 may be used to store data. The data store 24 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 24 may incorporate electronic, magnetic, optical, and/or other types of storage media.

The memory 25 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 25 may incorporate electronic, magnetic, optical, and/or other types of storage media. Note that the memory 25 may have a distributed architecture, where various components are situated remotely from one another, but can be accessed by the processor 22. The software in memory 25 can include one or more software programs, each of which includes an ordered listing of executable instructions for implementing logical functions. In the example of FIG. 2, the software in the memory system 25 may include a suitable operating system (O/S) 27 and programs 28. An operating system 27 essentially controls the execution of input/output interface 30 functions, and provides scheduling, input-output control, file and data management, memory management, and communication control and related services. The operating system 27 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 28 may include various applications, add-ons, etc. configured to provide end user functionality.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The apparatus 101 may optionally include a main memory, such as a random access memory (RAM) or other dynamic storage device (e.g., dynamic RAM (DRAM), static RAM (SRAM), and synchronous DRAM (SDRAM)), coupled to the control board 26 for storing information and instructions, sometimes called "firmware" that is written in codes such as "assembly", "C" and "Basic", to be executed by the processor 22. In addition, the main memory may be used for storing temporary variables or other intermediate information during the execution of instructions by the processor 22. The apparatus 101 may further optionally include a read only memory (ROM) or other static storage device (e.g., programmable ROM (PROM), erasable PROM (EPROM), and electrically erasable PROM (EEPROM)) coupled to the control board 26 for storing static information and instructions for the processor 22.

A power interrupter module 41 may be configured to selectively interrupt a power out supply 222 to a lighting element 201. In some embodiments, a power interrupter module 41 may comprise an electrically operated switch or relay. The power interrupter module 41 may be in electrical communication with a power in supply 221, such as communicated by a switch converter module 43 from a wall switch 202 (FIGS. 1, 3-6, and 10), building power supply wiring, fuse box, and the like, and also in electrical communication with a motion security light lighting element 201 to which the power interrupter module 41 may output power to. In some other embodiments, the power interrupter module may be activated by an activation signal 53 generated by a switch converter module 43. When the power in supply 221 is supplying power, such as when a wall switch 202 is in an on position, the power interrupter module 41 may enable or disable power to flow between the power in supply 221 and the power out supply 222 to the motion security light lighting element 201. By disabling the flow of power or power out supply 222, the power interrupter module 41 may interrupt the power supply to the lighting element. In preferred embodiments, the power interrupter module 41 may selectively interrupt power to a lighting element 202 by generating an interruption sequence 52 in the power out supply 222 to the lighting element 202.

In some embodiments, the apparatus 101 may comprise a switch converter module 43 in electrical communication with a power in supply 221 (FIG. 2) for example from a wall switch 202 (FIGS. 1, 3-6, and 10). The switch converter module 43 is configured to monitor the incoming power supply 221 for an interruption in power (e.g. a power input sequence 51) which may correspond to a desired status mode change of a lighting element 201 and covert the input sequence 51 from the incoming power supply 221 to a mode activation signal 53 recognized by the power interrupter module 41. In some embodiments, the switch converter module 43 may utilize a processor 22, memory 25, and programs 28 to first determine the type of power interruption input sequence 51 received and determine if that sequence corresponds to a sequence stored in memory 25. In further embodiments, if it is determined that the power interruption input sequence 51 does correspond to a sequence stored in memory 25, the processor 22 will instruct the apparatus 101 to generate a power interruption sequence 52 to the lighting element 201 which corresponds to the type of input signal sequences 51 received. By way of example, an input sequence 51 may correspond to a status mode of "Manual On" as determined by the switch converter module 43 and the apparatus 101 may generate a corresponding power interruption sequence 52 corresponding to a "Manual On" status mode sequence recognized by a particular lighting element 201. In this regard, the apparatus 101 may recognize a plurality of diverse input sequences 51 and translate them to a plurality of diverse power interruption sequences 52 thereby allowing multiple lighting elements 201 of different makes and manufactures to be controlled on the same power supply 221 circuit.

In some embodiments, the apparatus 101 may further comprise a sequence control module 42 having one or more manual switches 31. Manual switches 31 may be configured by a user to instruct the apparatus 101 on the proper interruption sequence 52 to use for different status modes of the lighting element. In some embodiments, manual switches 31 may be a type of switch, such as a dip switch 31A, a dial, or numeric input selector, which is able to select a number of power off signals and power on signals (e.g. 1×, 2×, 3×) and/or a time period (e.g. 1 s, 2 s, 3 s) in which they are performed. In this regard and in some embodiments, a user 300 is able to manually program the power interrupter module 41 to generate a plurality of diverse power interruption sequences 52. In yet further embodiments, the sequence control module 42 may be configured to automatically learn or receive programs 28 to instruct the power interrupter module 41 to generate a plurality of diverse power interruption sequences 52 based on a particular make and manufacture of lighting element 51. In this regard and in some embodiments, a user may simply use a short code or other similar convenient setting to instruct the sequence control module 42 to lookup in the memory 25 the appropriate power interruption sequences 52 to be used with a particular make and manufacture of lighting element 201.

Figure 3:
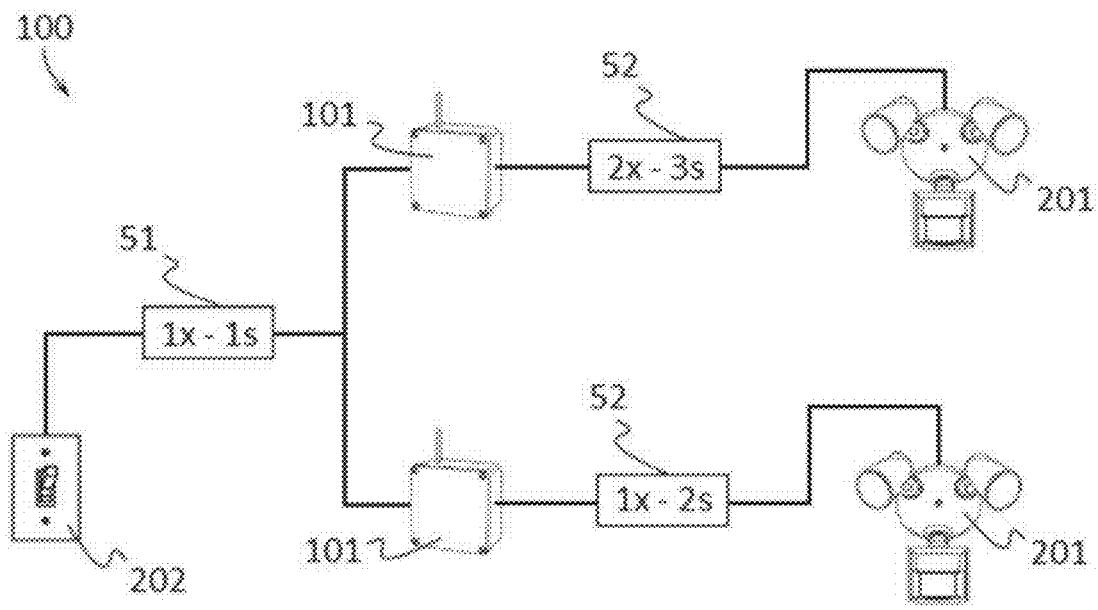
FIG. 3 shows an example of system and apparatus for selectively interrupting the power supply of lighting elements according to various embodiments described herein.

FIG. 3 shows an example of system 100 and apparatus 101 for selectively interrupting the power supply of motion security light lighting elements 201 according to various embodiments described herein. In some embodiments, the system 100 may comprise a wall switch 202 in electrical communication with one, two, three, four, five, six, or more apparatuses 101 with each apparatus 101 in electrical communication with a motion security light lighting element 201. Generally, each lighting element may have a status mode selected from one of a first status mode and a second status mode, and the first status mode may be selected from one of a manual on status mode and an auto on status mode.

In this example, the system 100 may comprise a wall switch 202 in electrical communication with two apparatuses 101 with each apparatus 101 in electrical communication with a motion security light lighting element 201. By modulating the wall switch 202 between an on position and an off position, an input sequence 51 may be formed. In some embodiments, an input sequence 51 may comprise a number of power off signals and power on signals. In further embodiments, an input sequence 51 may comprise a time period in which the number of power off signals and power on signals are performed. In the example of FIG. 3, the input signal 51 comprises one off signal and one on signal which are performed in a one second time period. It should be understood that an input sequence 51 may comprise any number of power off signals and power on signals, which may be in any order, and/or any length time period.

The input sequence 51 produced with the wall switch 202 may be communicated to each apparatus 101. In some embodiments, the input sequence 51 may be received by the power interrupter modules 41 (FIGS. 2, 5, and 6) of the apparatuses 101 and each power interrupter module 41 may selectively interrupt power to the respective lighting element 201 by generating an interruption sequence 52 in the power supply to the respective lighting element 201. In some embodiments, an interruption sequence 52 may comprise a number of power off signals and power on signals. In further embodiments, an interruption sequence 52 may comprise a time period in which the number of power off signals and power on signals are performed. In the example of FIG. 3, a first apparatus 101 and a second apparatus 101 may each receive an input sequence 51 of one set of a power off signal and a power on signal which are performed in a one second time period provided by a wall switch 202. The interrupter module 41 (FIGS. 2, 5, and 6) of the first apparatus 101 may selectively interrupt power to the first lighting element 201 by generating an interruption sequence 52 comprising two sets of a power off signal and a power on signal which are performed in a three second time period. This interruption sequence 52 may change the status mode of the first lighting element 201 from an auto on status mode to a manual on status mode. The interrupter module 41 of the second apparatus 101 may selectively interrupt power to the second lighting element 201 by generating an interruption sequence 52 comprising one set of a power off signal and a power on signal which is performed in a two second time period. This interruption sequence 52 may change the status mode of the second lighting element 201 from an auto on status mode to a manual on status mode. In this manner, one input sequence 51 may be used to change the status mode of one or more lighting elements 201.

Figure 4:
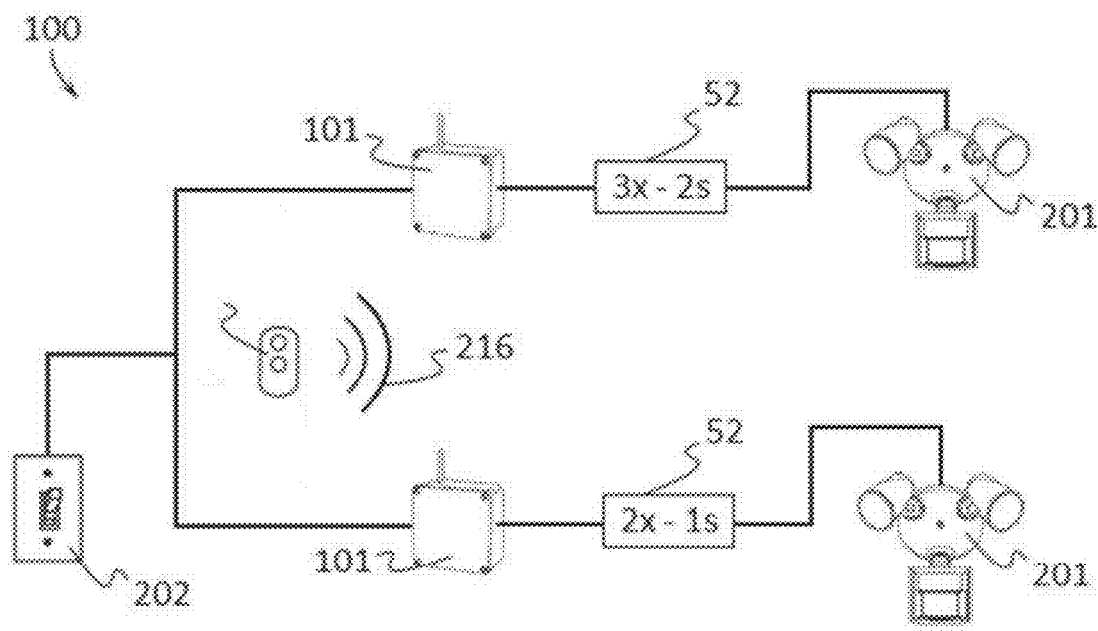
FIG. 4 shows an example of system and apparatus for selectively interrupting the power supply of lighting elements according to various embodiments described herein.

FIG. 4 shows an example of system 100 and apparatus 101 for selectively interrupting the power supply of motion security light lighting elements 201 according to various embodiments described herein. In this example, the system 100 may comprise a wall switch 202 in electrical communication with two apparatuses 101 with each apparatus 101 in electrical communication with a motion security light lighting element 201. Additionally, the system 100 may comprise an alternate remote 103 which may be configured to provide a remote signal 216 wireless communication to both of the apparatuses 101. In some embodiments, an alternate remote 103 may be configured to provide a wireless communication 216 which may comprise a number of power off signals and power on signals and/or a time period in which the number of power off signals and power on signals are performed such as an input sequence 51. In other embodiments, a wireless communication 216 may comprise any type of signal which may be received by the antenna 29 (FIG. 2) of the radio module 23 (FIG. 2) of an apparatus 101 and which may be used by the processor 22 to signal the power interrupter module 41 and/or sequence control module 42 (FIGS. 2, 5, and 6) to form an interruption sequence 52.

The wireless communication 216 may be communicated to each apparatus 101 with each apparatus 101 receiving power from the wall switch 202 or other power input. In some embodiments, the input sequence 51 may be communicated to the power interrupter modules 41 (FIGS. 2, 5, and 6) and/or sequence control modules 42 of the apparatuses 101 and each power interrupter module 41 and/or sequence control module 42 may selectively interrupt power to the respective lighting element 201 by generating an interruption sequence 52 in the power supply to the respective lighting element 201.

Figure 14:
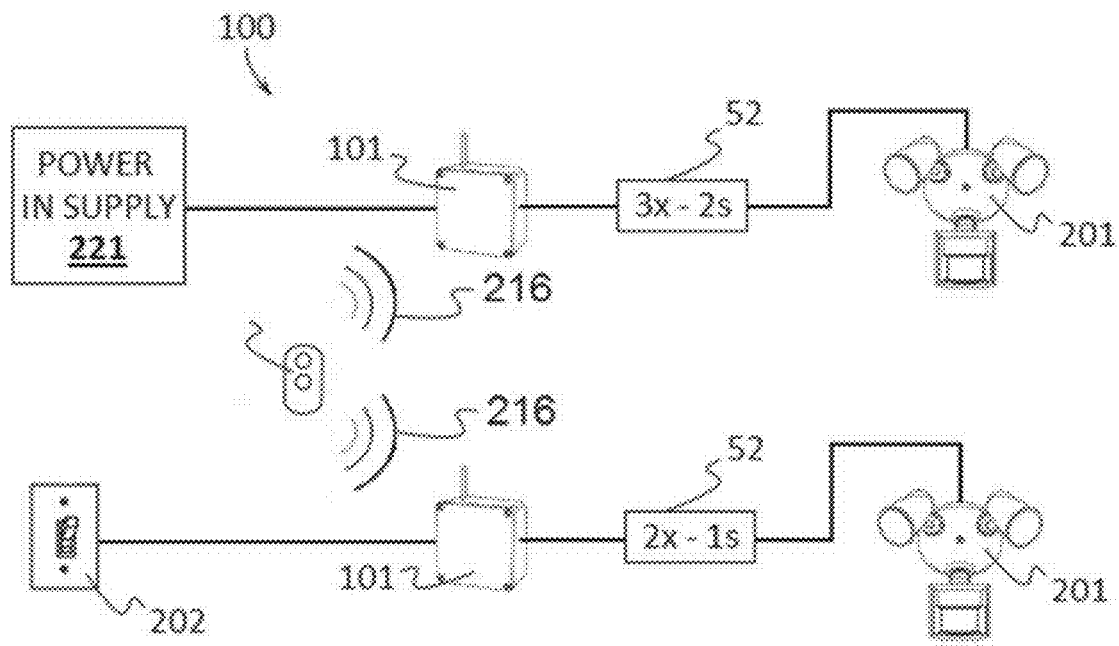
FIG. 14 illustrates another example of system and apparatus for selectively interrupting the power supply of lighting elements according to various embodiments described herein.

In the example of FIG. 4, a first apparatus 101 and a second apparatus 101 may each receive a wireless communication 216 provided by alternate remote 103. The interrupter module 41 of the first apparatus 101 may selectively interrupt power to the first lighting element 201 by generating an interruption sequence 52 comprising three sets of a power off signals and power on signals which are performed in a two second time period. This interruption sequence 52 may change the status mode of the first lighting element 201 from a manual on status mode to an auto on status mode. By way of example and as shown in FIG. 14, with multiple button remotes 103, the user 300 may directly select the desired status mode of a more than one lighting element 201 with a first button for "ON" and a second for "Auto" with the remote 103 providing a first wireless communication remote signal 216 indicating that an apparatus 101 should change a first lighting element 201 to a manual on status mode when the first button is pressed and providing a second wireless communication remote signal 216 indicating that an apparatus 101 should change a second lighting element 201 to an auto on status mode when the second button is pressed. The interrupter module 41 of the second apparatus 101 may selectively interrupt power to the second lighting element 201 by generating an interruption sequence 52 comprising two sets of power off signals and power on signals which are performed in a one second time period. This interruption sequence 52 may change the status mode of the second lighting element 201 from a manual on status mode to an auto on status mode. In this manner, one wireless communication remote signal 216 from an alternate remote 103 may be used to change the status mode of one or more lighting elements 201 to another status mode. In other embodiments, an alternate remote 103 may provide two or more remote signals 216 which may be received by two or more apparatuses 101 to signal a change from one or a first status mode to another or second status mode.

Figure 5:
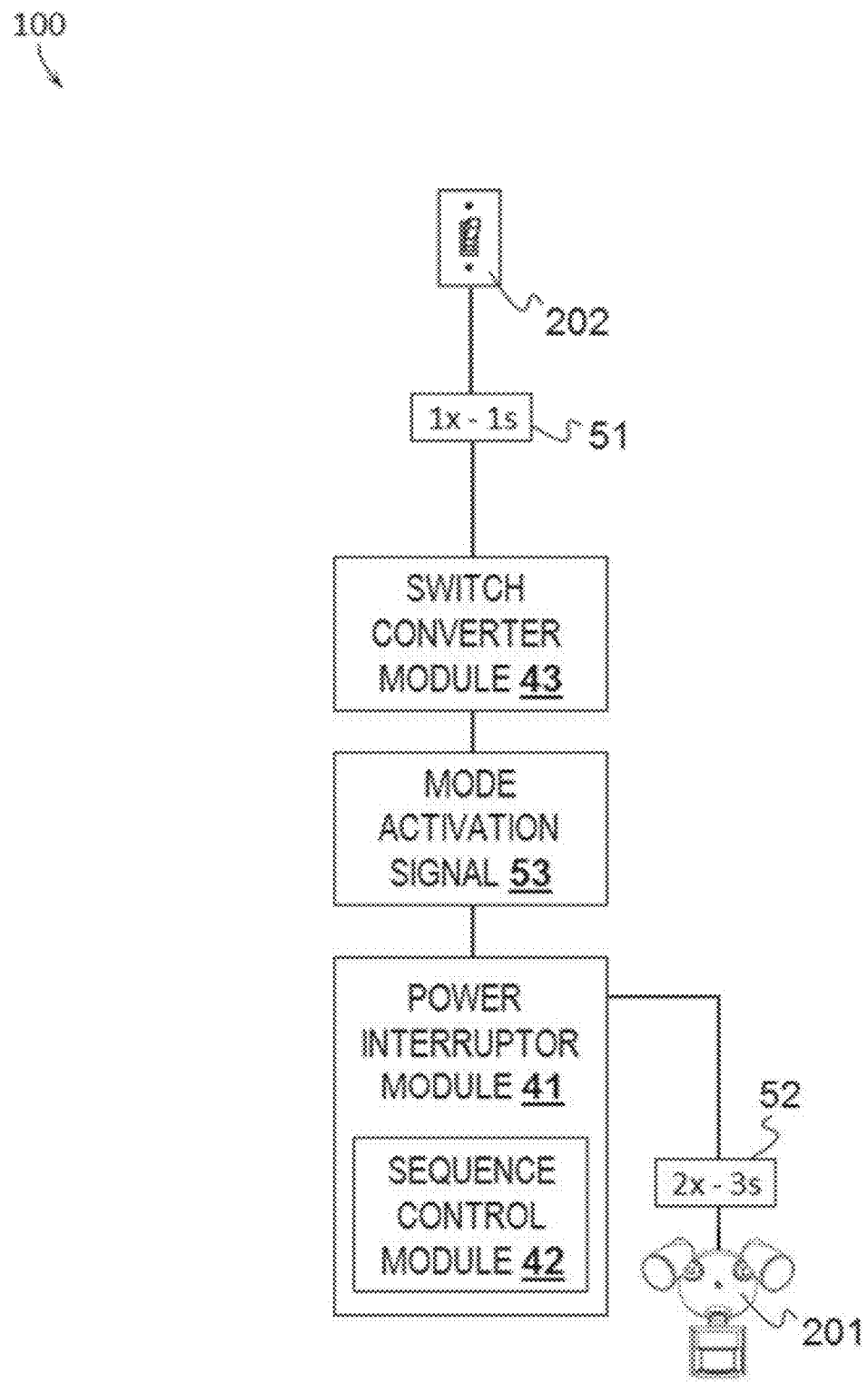
FIG. 5 illustrates an example of system and apparatus for selectively interrupting the power supply of lighting elements according to various embodiments described herein.

FIG. 5 illustrates an example of system 100 and apparatus 101 for selectively interrupting the power supply of a lighting element 201 according to various embodiments described herein. In this example, the system 100 may comprise a wall switch 202 in electrical communication with two apparatuses 101 with each apparatus 101 in electrical communication with a motion security light lighting element 201. Each apparatus 101 may comprise a sequence control module 42 which may be in electrical communication with the power interrupter module 41. In further embodiments and in this example, the sequence control module 42 of each apparatus 101 may receive a first input sequence 51, for example one set of a power off signal and a power on signal which is performed in a one second time period, from the wall switch 202 and may translate the input sequence 51 to a mode activation signal 53 recognized by its respective power interrupter module 41. In this example, a first mode activation signal 53 may be communicated to the first power interrupter module 41 from the first sequence control module 42 and, using the first mode activation signal 53, the first power interrupter module 41 may generate a first interruption sequence 52. The first interruption sequence 52 may comprise two sets of a power off signal and a power on signal which are performed in a three second time period and which may be used to change the first motion security light lighting element 201 from a first status mode to a second status mode. The first interruption sequence 52 may be communicated to the first motion security light lighting element 201 and the first lighting element 201 may change from a first status mode to a second status mode, such as from an auto on status mode to a manual on status mode. Likewise, a second mode activation signal 53 may be communicated to the second power interrupter module 41 from the second sequence control module 42 and, using the second mode activation signal 53, the second power interrupter module 41 may generate a second interruption sequence 52. The second interruption sequence 52 may comprise one set of a power off signal and a power on signal which is performed in a two second time period and which may be used to change the second motion security light lighting element 201 from a first status mode to a second status mode. The second interruption sequence 52 may be communicated to the second motion security light lighting element 201 and the second lighting element 201 may change from a second status mode to a second status mode, such as from an auto on status mode to a manual on status mode.

Figure 6:
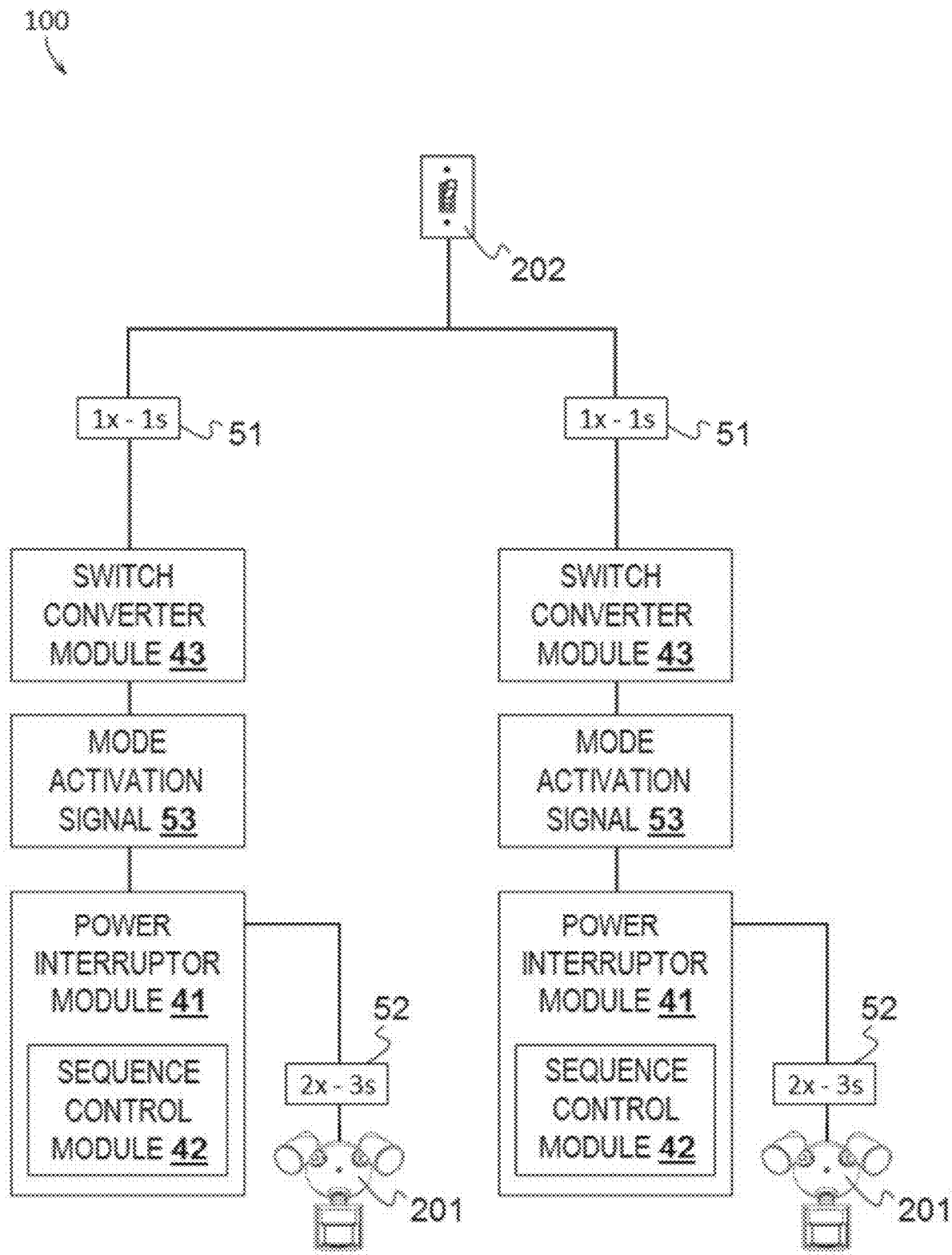
FIG. 6 shows an example of system and two apparatuses for selectively interrupting the power supply of lighting elements according to various embodiments described herein.

FIG. 6 shows an example of system 100 and apparatus 101 for selectively interrupting the power supply of two lighting elements 201 according to various embodiments described herein. In some embodiments, an interruption sequence 52 may be set by a sequence control module 42 which may be in electrical communication with the power interrupter module 41. In further embodiments and in this example, the sequence control module 42 may receive a first input sequence 51, for example one set of a power off signal and a power on signal which is performed in a one second time period, from a wall switch 202 and may translate the input sequence 51 to a mode activation signal 53 recognized by the power interrupter module 41. The mode activation signal 53 may be communicated to the power interrupter module 41 from the sequence control module 42 and, using the mode activation signal 53, the power interrupter module 41 may generate an interruption sequence 52, for example two sets of a power off signal and a power on signal which are performed in a three second time period, which may be used to change the motion security light lighting element 201 from a first status mode to a second status mode. The interruption sequence 52 may be communicated to the motion security light lighting element 201 and the lighting element 201 may change from a first status mode to a second status mode, such as from a manual on status mode and an auto on status mode.

Figure 7:
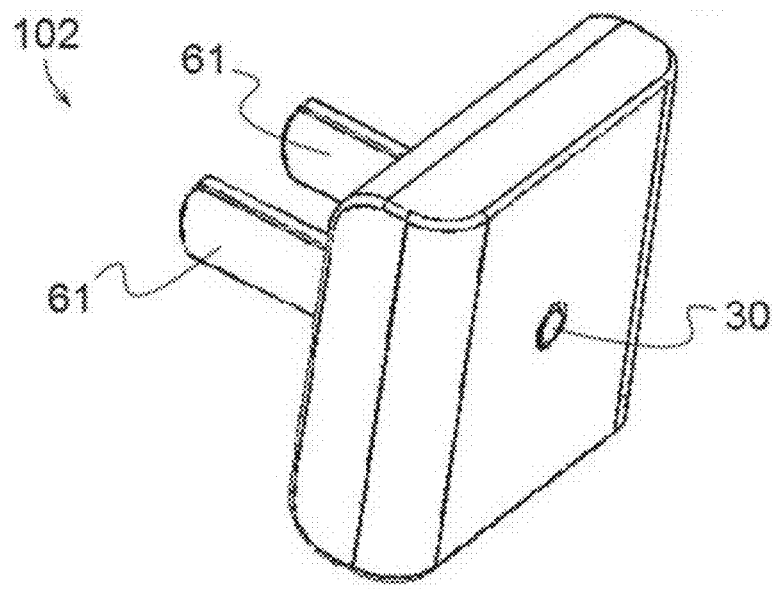
FIG. 7 illustrates one example of a home automation remote according to various embodiments described herein.
Figure 8:
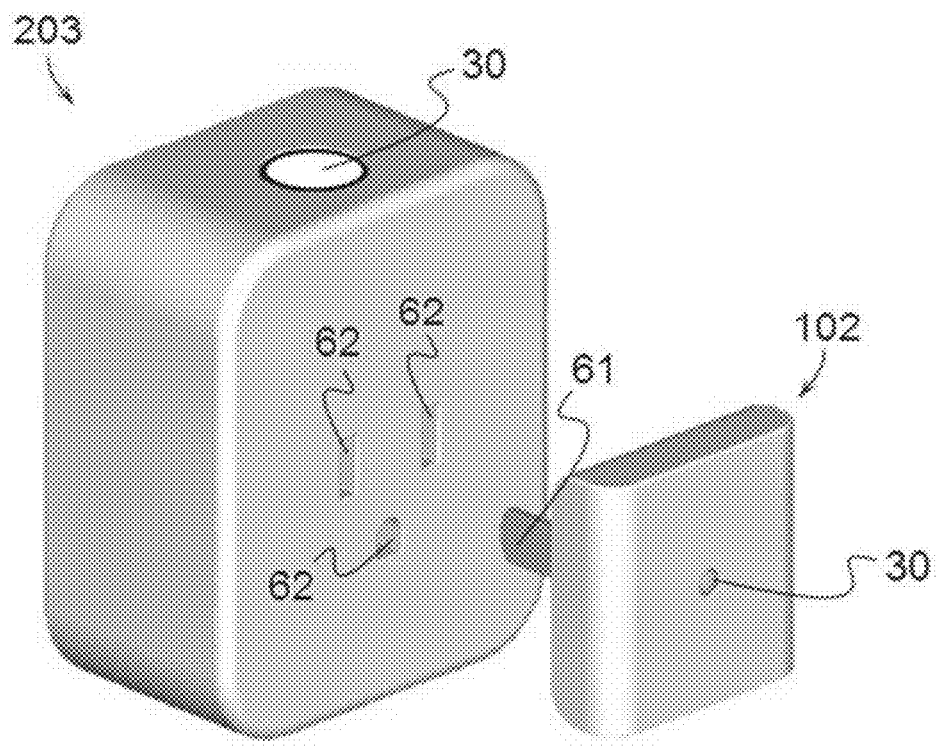
FIG. 8 shows one example of a home automation remote and home automation remote receptacle according to various embodiments described herein.

FIGS. 7 and 8 illustrate one example of a home automation remote 102 according to various embodiments described herein. The home automation remote 102 may be used with a home automation wall module 203 (FIG. 8). In some embodiments, the home automation remote 102 may comprise a set of power plugs 61 which may be inserted into the power sockets 62 of a home automation wall module 203. Additionally, a home automation wall module 203 may comprise a set of power plugs 61 which may be inserted into the power sockets 62 of a power outlet thereby connecting the home automation wall module 203 to the primary alternating current (AC) power supply in a building. The home automation wall module 203 may further comprise a control unit which may be configured to enable or disable power to be communicated from the power plugs 61 of the home automation wall module 203 to the power sockets 62 of the home automation wall module 203.

Typically, the control unit is in wireless communication with a central hub of a home automation system. Through the wireless communication, the hub may signal the home automation wall module 203 to enable or disable power to flow from the power sockets 61 of the power outlet, through the home automation wall module 203, and out of the home automation wall module 203 through its set of power sockets 62. In this manner, an appliance, such as a lamp, air conditioner, coffee maker, etc., which is plugged into the home automation wall module 203, may have its power supply enabled or disabled by the hub which the home automation wall module 203 is in communication with. By engaging the set of power plugs 61 of a home automation remote 102 to the power sockets 62 of a home automation wall module 203, the communication the hub may signal the home automation wall module 203 to enable or disable power to flow to the engaged home automation remote 102.

Figure 9:
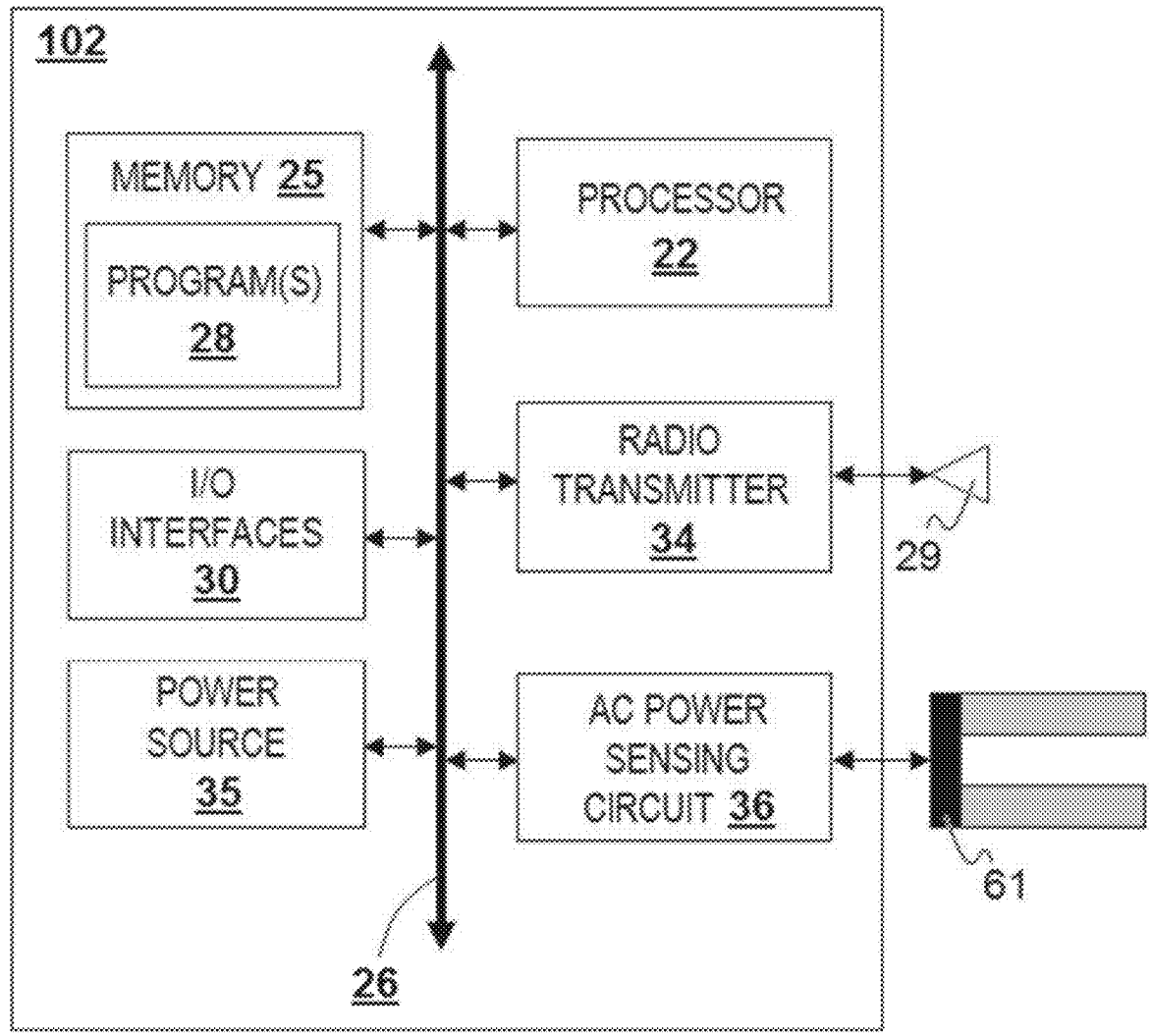
FIG. 9 shows a block diagram depicting one example of a home automation remote according to various embodiments described herein.

FIG. 9 illustrates a block diagram showing some of the elements of one example of a home automation remote 102 according to various embodiments described herein. In some embodiments and in the present example, the home automation remote 102 can be a digital device that, in terms of hardware architecture, comprises a processor 22, an input/output (I/O) interface 30, a radio transmitter 34, a memory 25, power source 34, and an AC power sensing circuit 36. It should be appreciated by those of ordinary skill in the art that FIG. 9 depicts the home automation remote 102 in an oversimplified manner, and a practical embodiment may include additional components or elements and suitably configured processing logic to support known or conventional operating features that are not described in detail herein.

In preferred embodiments, one or more components (22, 30, 34, 35, 25, and 36) are communicatively coupled via a local interface or control board 26 on a single chip sometimes called a system on a chip (SoC) or system on chip (SOC). In further preferred embodiments, a control board 26 may be a microcontroller (or MCU, short for microcontroller unit) which may be a small computer (SoC) on a single integrated circuit containing one or more components (22, 30, 34, 35, 25, and 36).

The I/O interfaces 30 can be used to input and/or output information to a user 300 (FIG. 1). In some embodiments, I/O interfaces 30 may include one or more turnable control knobs, depressible button type switches, a key pad, slide type switches, rocker type switches, or any other suitable input which a user 300 may interact with to provide input. In further embodiments, I/O interfaces 30 may include one or more light emitting elements or other display device, e.g., a LED (light emitting diode) display or LCD (liquid crystal display) monitor, speaker, or any other suitable device for outputting or displaying information.

A radio transmitter 34 may enable wireless communication to an apparatus 101 for selectively interrupting the power supply of lighting elements 201 through an antenna 29. A radio transmitter 34 may a wireless communication transmitter which is configured to produce a remote signal 216 wireless communication which may be received by the radio module 23 of the apparatus 101. In preferred embodiments, the radio transmitter 34 may comprise or include a code hopping coder designed for secure Remote Keyless Entry (RKE) systems. For example, the radio transmitter 34 may comprise or include a HCS301 RF KeeLoQ Code Hopping Encoder manufactured by Microchip Technology Inc. or the like which may be configured to provide encrypted remote signals, such as with rolling code encryption or any other suitable encryption method.

A power source 35 may provide electrical power to any component of a home automation remote 102 that may require electrical power. A power source 35 may comprise a battery, such as a lithium ion battery, nickel cadmium battery, alkaline battery, or any other suitable type of battery, a fuel cell, a capacitor, a super capacitor or any other type of energy storing and/or electricity releasing device. In further embodiments, a power source 35 may comprise a power cord, kinetic or piezo electric battery charging device, a solar cell or photovoltaic cell, and/or inductive charging or wireless power receiver.

An AC power sensing circuit 36 may comprise any type of alternating current (AC) sensor which is able to detect the presence of AC power. The AC power sensing circuit 36 may be in electrical communication with a set of power plugs 61 and may generate an output signal in response to the presence or absence of AC current in the set of power plugs 61. Optionally, an AC power sensing circuit 36 may generate an output signal proportional to the measured current in the set of power plugs 61.

The home automation remote 102 may include a memory 25, such as a random access memory (RAM) or other dynamic storage device (e.g., dynamic RAM (DRAM), static RAM (SRAM), and synchronous DRAM (SDRAM)), coupled to the control board 26 for storing information and instructions to be executed by the processor 22. The instructions may be in the form of one or more programs 28. For example, a program 28 may instruct the radio transmitter 34 to send a remote signal 216 when the AC power sensing circuit 36 detects the presence and/or absence of AC current in the set of power plugs 61. In addition, the memory 25 may be used for storing temporary variables or other intermediate information during the execution of instructions by the processor 22. The memory 25 may further optionally include a read only memory (ROM) or other static storage device (e.g., programmable ROM (PROM), erasable PROM (EPROM), and electrically erasable PROM (EEPROM)) coupled to the control board 26 for storing static information and instructions for the processor 22.

Figure 10:
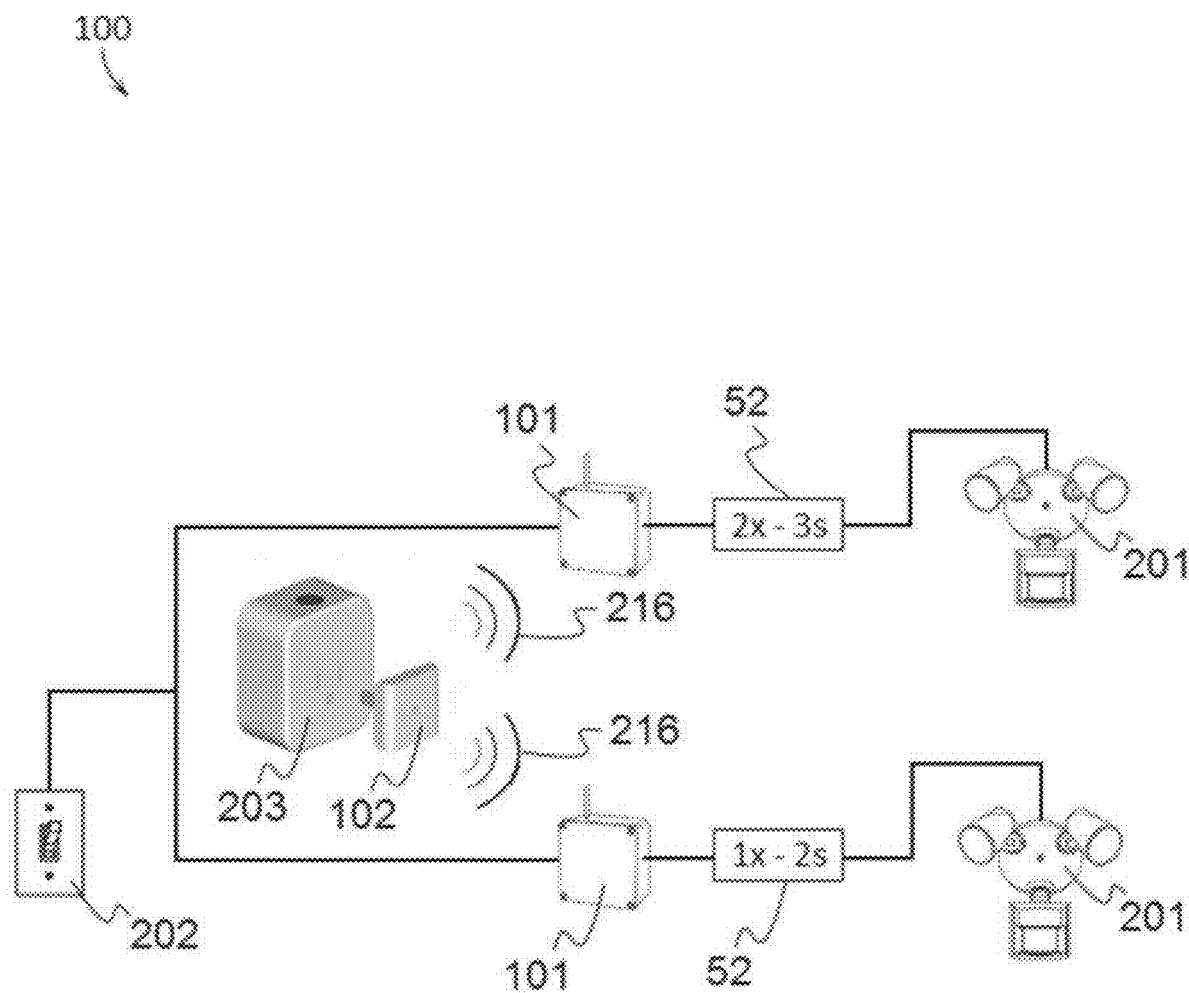
FIG. 10 depicts one example of a home automation remote in wireless communication with two apparatuses for selectively interrupting the power supply of lighting elements according to various embodiments described herein.
Figure 15:
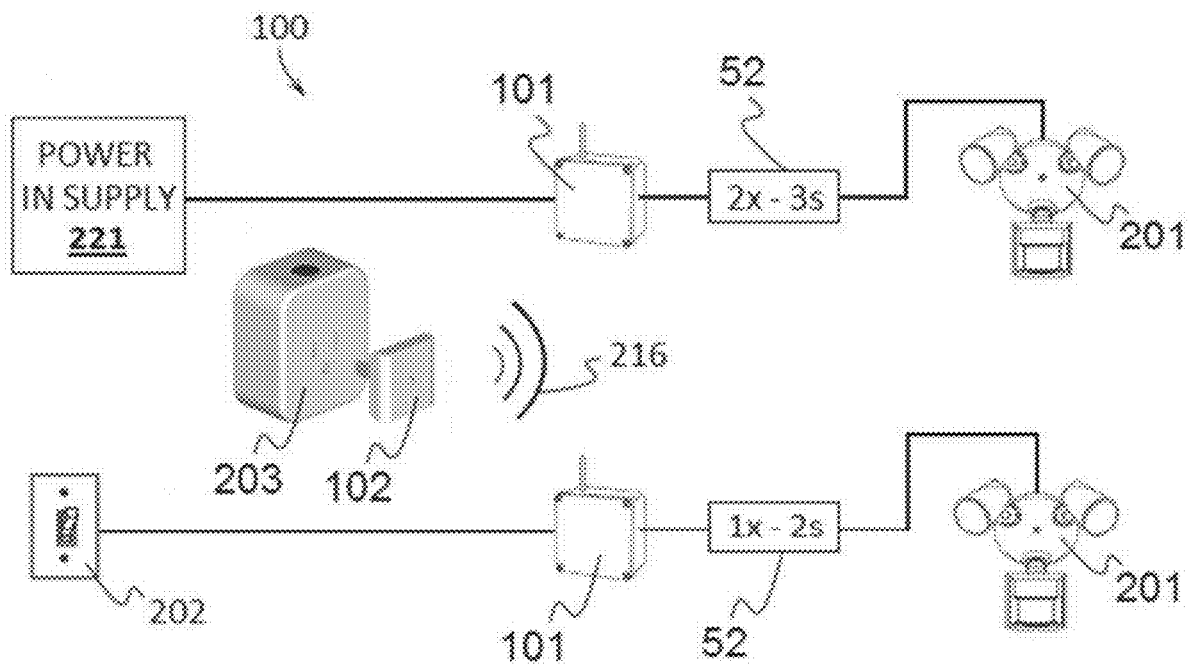
FIG. 15 shows another example of a home automation remote in wireless communication with two apparatuses for selectively interrupting the power supply of lighting elements according to various embodiments described herein.

FIG. 10 depicts one example of a system 100 for changing the status mode of a first lighting element comprising a home automation remote 102 in wireless communication with two apparatuses 101 for selectively interrupting the power supply of lighting elements 201 according to various embodiments described herein. In this example, the system 100 may comprise a wall switch 202 in electrical communication with two apparatuses 101 with each apparatus 101 in electrical communication with a motion security light lighting element 201. Additionally, the system 100 may comprise a home automation remote 102 which may be optionally configured to provide a remote signal 216 wireless communication to both of the apparatuses 101 as shown in FIG. 15. Optionally, the home automation remote 102 may be configured to provide a first remote signal 216 wireless communication to a first apparatus 101 and a second remote signal 216 wireless communication to a second apparatus 101 as shown in FIG. 10. In further embodiments, a home automation remote 102 may send out a wireless remote signal 216 that can be received by any number of apparatuses 101 that are within the signal 216 range although not all apparatuses 101 that receive the signal 216 may provide an interruption sequence 52 to a lighting element 201 in response to receiving the signal 216 even if the apparatuses 101 are on different power circuits as shown in FIG. 15.

The home automation remote 102 may comprise a set of power plugs 61 (FIGS. 7-9) which may be inserted into the power sockets 62 (FIG. 8) of a home automation wall module 203. The home automation wall module 203 may comprise a set of power plugs 61 which may be inserted into the power sockets 62 of a power outlet thereby connecting the home automation wall module 203 to the primary alternating current (AC) power supply in a building. The home automation wall module 203 may further comprise a control unit which may be configured to enable or disable power to be communicated from the power plugs 61 of the home automation wall module 203 to the power sockets 62 of the home automation wall module 203.

The control unit of the home automation wall module 203 may be in wireless communication with a central hub of a home automation system. Through the wireless communication, the hub may signal the home automation wall module 203 to enable or disable power to flow from the power sockets 61 of the power outlet, through the home automation wall module 203, and out of the home automation wall module 203 through its set of power sockets 62. By engaging the set of power plugs 61 of a home automation remote 102 to the power sockets 62 of a home automation wall module 203, the communication the hub may signal the home automation wall module 203 to enable or disable power to flow to the engaged home automation remote 102.

In some embodiments, the AC power sensing circuit 36 (FIG. 9) of the home automation remote 102 may detect the presence of AC power in the power sockets 62 of the home automation wall module 203, such as when a home automation hub may signal the home automation wall module 203 to enable power to flow from the power sockets 61 of the power outlet, through the home automation wall module 203, and out of the home automation wall module 203 through its set of power sockets 62. The presence of AC power may comprise an electrical signal from the home automation wall module 203 to the home automation remote 102. Once the AC power sensing circuit 36 detects power or receives an electrical signal, such as in a power plug 61 that is in electrical communication with the home automation receptacle module 203, the processor 22 may instruct the radio transmitter 34 (FIG. 9) of the home automation remote 102 to transmit a remote signal 216 to one or more apparatuses 101. In some embodiments, the home automation remote 102 may provide a single remote signal 216 to one or more apparatuses 101 upon receiving an electrical signal from a home automation wall module 203. In other embodiments, the home automation remote 102 may provide more than one remote signal 216 to one or more apparatuses 101 upon receiving an electrical signal from a home automation wall module 203.

A remote signal 216 may be received by the respective radio modules 23, such as through their respective antennas 29, of the apparatuses 101. The remote signal 216 wireless communication may be communicated to each apparatus 101 with each apparatus 101 receiving power from the wall switch 202 or other power input. In some embodiments, a home automation remote 102 may be configured to provide a wireless communication 216 which may comprise a number of power off signals and power on signals and/or a time period in which the number of power off signals and power on signals are performed such as an input sequence 51. In other embodiments, a wireless communication 216 may comprise any type of signal which may be received by the antenna 29 (FIG. 2) of the radio module 23 (FIG. 2) of an apparatus 101 and which may be used by a processor 22 to signal the power interrupter module 41 and/or sequence control module 42 (FIGS. 5 and 6) to form an interruption sequence 52. In some embodiments, the remote signal 216, or the receipt of the remote signal 216, may be communicated to the processor 22 of each apparatus 101. Based on one or more programs 28 and/or manual switches 31 the power interrupter modules 41 (FIGS. 2, 5, and 6) and/or sequence control modules 42 of the apparatuses 101 may selectively interrupt power to their respective lighting element 201 by generating an interruption sequence 52 in the power supply to their respective lighting element 201.

In the example of FIG. 10, a first apparatus 101 and a second apparatus 101 may each receive a wireless communication 216 provided by a home automation remote 102. The interrupter module 41 of the first apparatus 101 may selectively interrupt power to the first lighting element 201 by generating an interruption sequence 52 comprising two sets of a power off signals and power on signals which are performed in a three second time period. This interruption sequence 52 may change the status mode of the first lighting element 201 from a manual on status mode to an auto on status mode. The interrupter module 41 of the second apparatus 101 may selectively interrupt power to the second lighting element 201 by generating an interruption sequence 52 comprising one set of power off signals and power on signals which are performed in a two second time period. This interruption sequence 52 may change the status mode of the second lighting element 201 from one status mode to another status mode, such as from a manual on status mode to an auto on status mode. In this manner, one wireless communication 216 from a home automation remote 102 may be used to change the status mode of one or more lighting elements 201 to another status mode. In other embodiments, a home automation remote 102 may provide two or more remote signals 216 which may be received by two or more apparatuses 101 to signal a change from one or a first status mode to another or second status mode.

Figure 11:
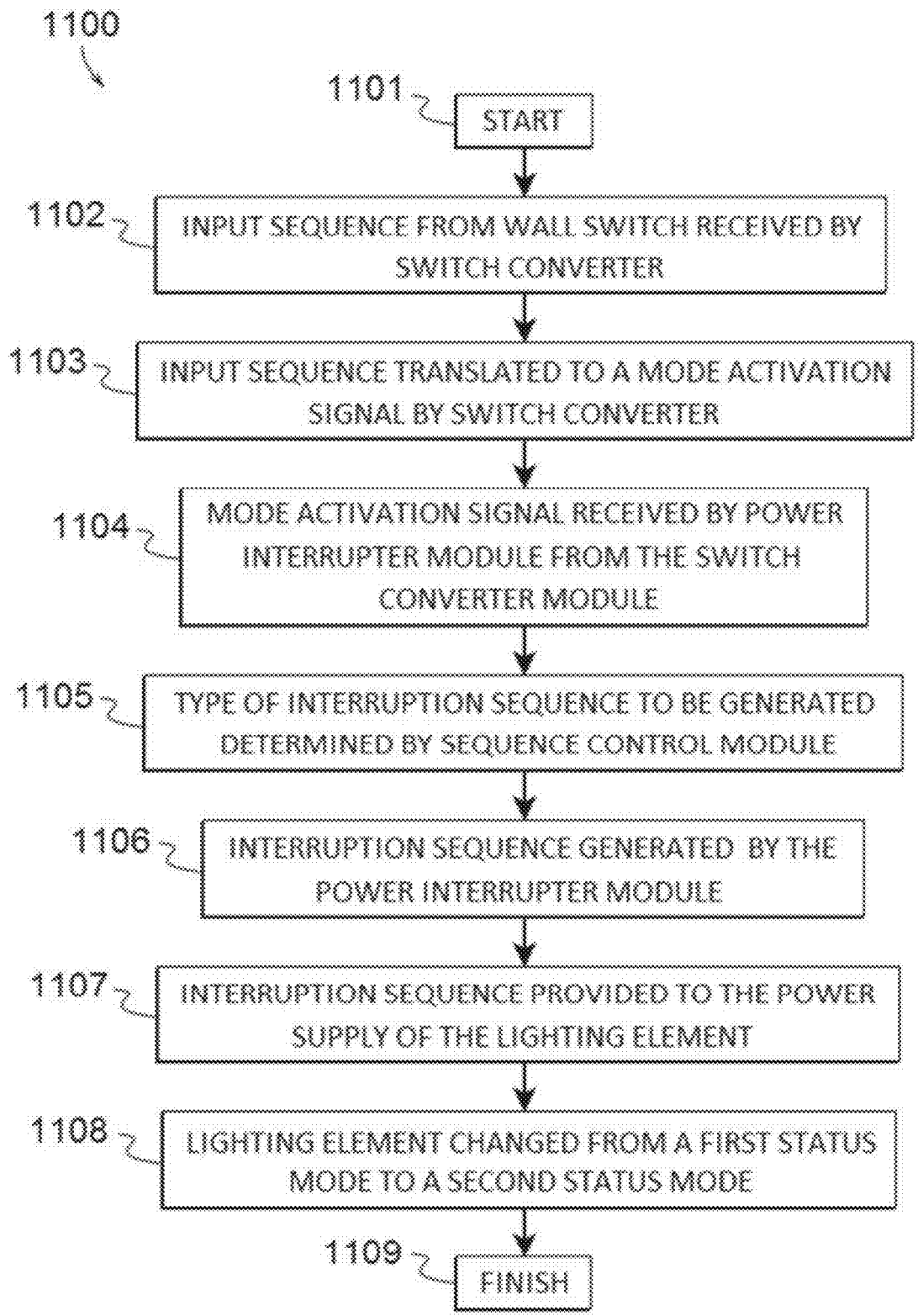
FIG. 11 illustrates an example of a process which may be implemented by an apparatus for selectively interrupting the power supply of lighting elements according to various embodiments described herein.

FIG. 11 illustrates an example of a process which may be implemented by an apparatus for selectively interrupting the power supply of lighting elements ("the process") 1100 according to various embodiments described herein. In some embodiments, the process 1100 may be used to change the status mode of a one or more lighting elements 201 in which each lighting element 201 is in electrical communication with an apparatus 101 for selectively interrupting the power supply of lighting elements.

In some embodiments, the process 1100 may start 1101 and an input sequence 51 may be received by a switch converter 43 of an apparatus 101 from a wall switch 202 in step 1102. In some embodiments, a user 300 may provide an input sequence 51 to an apparatus 101 by modulating a wall switch 202 which is in electrical communication with one or more apparatuses 101 between an off position and an on position thereby modulating off and on the power supplied from the wall switch 202 to the apparatuses 101 to form an input sequence 51. In further embodiments, a user 300 may provide an input sequence 51 to an apparatus 101 by enabling or disabling power to be communicated from the power sockets of a home automation wall module 203 to the power plugs of a home automation remote 102. A home automation remote 102 may be in wireless communication, such as by providing a remote signal 216, with an apparatus 101 that is in electrical communication with a motion security light lighting element 201 thereby providing an input sequence 51 to the apparatus 101.

Next in step 1103, the input sequence 51 may be translated to a mode activation signal by the switch converter 43. A switch converter module 43 may be in electrical communication with a power in supply 221 for example from a wall switch 202 (FIGS. 1, 3-6, and 10). The switch converter module 43 is configured to monitor the incoming power supply 221 for an interruption in power (e.g. a power input sequence 51) which may correspond to a desired status mode change of a lighting element 201 and covert the input sequence 51 from the incoming power supply 221 to a mode activation signal 53 recognized by the power interrupter module 41.

In step 1104, the mode activation signal 53 may be received by a power interrupter module 41 from the switch converter module 43. In some embodiments, a control board 26 may provide electrical communication between a power interrupter module 41 and the switch converter module 43 to allow the mode activation signal 53 to be received by a power interrupter module 41 from the switch converter module 43. In further embodiments, a control board 26, power interrupter module 41, and the switch converter module 43 may be formed as a microcontroller which provides electrical communication to allow the mode activation signal 53 to be received by the power interrupter module 41 from the switch converter module 43.

In step 1105, a sequence control module 42 may determine the type of interruption sequence 52 to be generated by the power interrupter module 41. In some embodiments, a sequence control module 42 may have one or more manual switches 31. Manual switches 31 may be configured by a user to instruct the apparatus 101 on the proper interruption sequence 52 to use for different status modes of the lighting element. In this regard and in some embodiments, a user is able to manually program the power interrupter module 41 to generate a plurality of diverse power interruption sequences 52. In yet further embodiments, the sequence control module 42 may be configured to automatically learn or receive programs 28 to instruct the power interrupter module 41 to generate a plurality of diverse power interruption sequences 52 based on a particular make and manufacture of lighting element 51. In this regard and in some embodiments, a user may simply use a short code or other similar convenient setting to instruct the sequence control module 42 to lookup in the memory 25 the appropriate power interruption sequences 52 to be used with a particular make and manufacture of lighting element 201.

In step 1106, an interruption sequence 52 may be generated by the power interrupter module 41. In some embodiments, an interruption sequence 52 may comprise a number of power off signals and power on signals. In further embodiments, an interruption sequence 52 may comprise a time period in which the number of power off signals and power on signals are performed.

The interruption sequence 52 may be provided to the power supply of one or more lighting elements 201 in step 1107. The interrupter module 41 of an apparatus 101 may selectively interrupt power to a lighting element 201 by generating an interruption sequence 52 comprising one or more sets of a power off signals and a power on signals which are performed in a time period. In preferred embodiments, the power interrupter module 41 may selectively interrupt power to a lighting element 202 by generating an interruption sequence 52 in the power supply to the lighting element 202.

Next in step 1108, the one or more lighting elements 201 may be changed from a first status mode to a second status mode upon receiving an interruption sequence 52 in their respective power supplies. Preferably, an interruption sequence 52 provided to a lighting elements 201 may have one or more sets of a power off signals and a power on signals which are performed in a time period that correspond to the number of sets of power off signals and a power on signals which are performed in a time period as set up by the manufacturer of the respective lighting element 201 for changing the first status mode of the lighting element 201 to a second status mode. After step 1108, the process 1100 may finish 1109.

Figure 12:
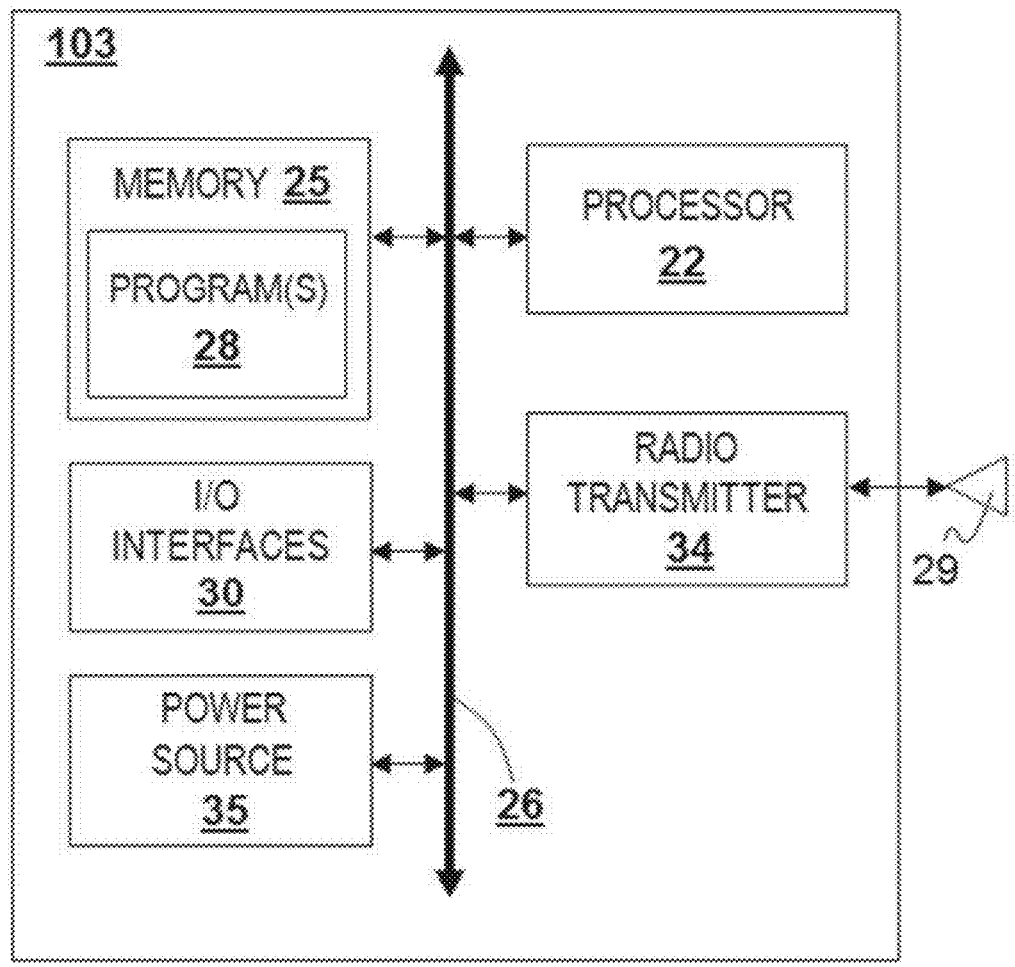
FIG. 12 shows a block diagram depicting one example of an alternative remote according to various embodiments described herein.
Figure 13:
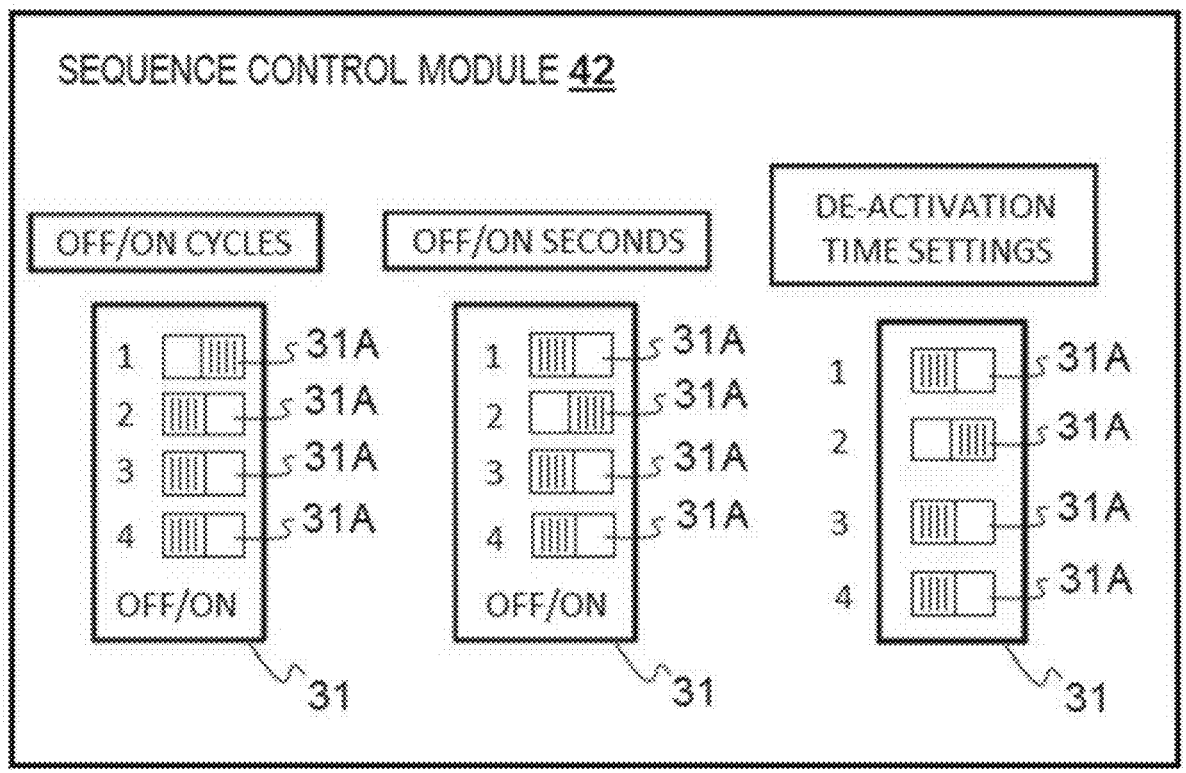
FIG. 13 depicts an example of a sequence control module comprising manual switches according to various embodiments described herein.

FIG. 12 shows a block diagram depicting one example of an alternative remote 103 according to various embodiments described herein. In some embodiments and in the present example, the alternative remote 103 can be a digital device that, in terms of hardware architecture, comprises a processor 22, an input/output (I/O) interface 30, a radio transmitter 34, a memory 25, and power source 34. It should be appreciated by those of ordinary skill in the art that FIG. 12 depicts the alternative remote 103 in an oversimplified manner, and a practical embodiment may include additional components or elements and suitably configured processing logic to support known or conventional operating features that are not described in detail herein.

In preferred embodiments, one or more components (22, 30, 34, 35, and 25) are communicatively coupled via a local interface or control board 26 on a single chip sometimes called a system on a chip (SoC) or system on chip (SOC). In further preferred embodiments, a control board 26 may be a microcontroller (or MCU, short for microcontroller unit) which may be a small computer (SoC) on a single integrated circuit containing one or more components (22, 30, 34, 35, and 25).

The I/O interfaces 30 can be used to input and/or output information to a user 300 (FIG. 1). In some embodiments, I/O interfaces 30 may include one or more turnable control knobs, depressible button type switches, a key pad, slide type switches, rocker type switches, or any other suitable input which a user 300 may interact with to provide input. In further embodiments, I/O interfaces 30 may include one or more light emitting elements or other display device, e.g., a LED (light emitting diode) display or LCD (liquid crystal display) monitor, speaker, or any other suitable device for outputting or displaying information.

A radio transmitter 34 may enable wireless communication to an apparatus 101 for selectively interrupting the power supply of lighting elements 201 through an antenna 29. A radio transmitter 34 may a wireless communication transmitter which is configured to produce a remote signal 216 wireless communication which may be received by the radio module 23 of the apparatus 101. In preferred embodiments, the radio transmitter 34 may comprise or include a code hopping encoder designed for secure Remote Keyless Entry (RKE) systems. For example, the radio transmitter 34 may comprise or include a HCS301 RF KeeLoQ Code Hopping Encoder manufactured by Microchip Technology Inc. or the like which may be configured to provide encrypted remote signals, such as with rolling code encryption or any other suitable encryption method.

A power source 35 may provide electrical power to any component of an alternate remote 103 that may require electrical power. A power source 35 may comprise a battery, such as a lithium ion battery, nickel cadmium battery, alkaline battery, or any other suitable type of battery, a fuel cell, a capacitor, super capacitor or any other type of energy storing and/or electricity releasing device. In further embodiments, a power source 35 may comprise a power cord, kinetic or piezo electric battery charging device, a solar cell or photovoltaic cell, and/or inductive charging or wireless power receiver.

The alternate remote 103 may include a memory 25, such as a random access memory (RAM) or other dynamic storage device (e.g., dynamic RAM (DRAM), static RAM (SRAM), and synchronous DRAM (SDRAM)), coupled to the control board 26 for storing information and instructions to be executed by the processor 22. The instructions may be in the form of one or more programs 28. For example, a program 28 may instruct the radio transmitter 34 to send a remote signal 216 when a user operates one or more input/output (I/O) interfaces 30 of the alternate remote 103. In addition, the memory 25 may be used for storing temporary variables or other intermediate information during the execution of instructions by the processor 22. The memory 25 may further optionally include a read only memory (ROM) or other static storage device (e.g., programmable ROM (PROM), erasable PROM (EPROM), and electrically erasable PROM (EEPROM)) coupled to the control board 26 for storing static information and instructions for the processor 22.

Figure 16:
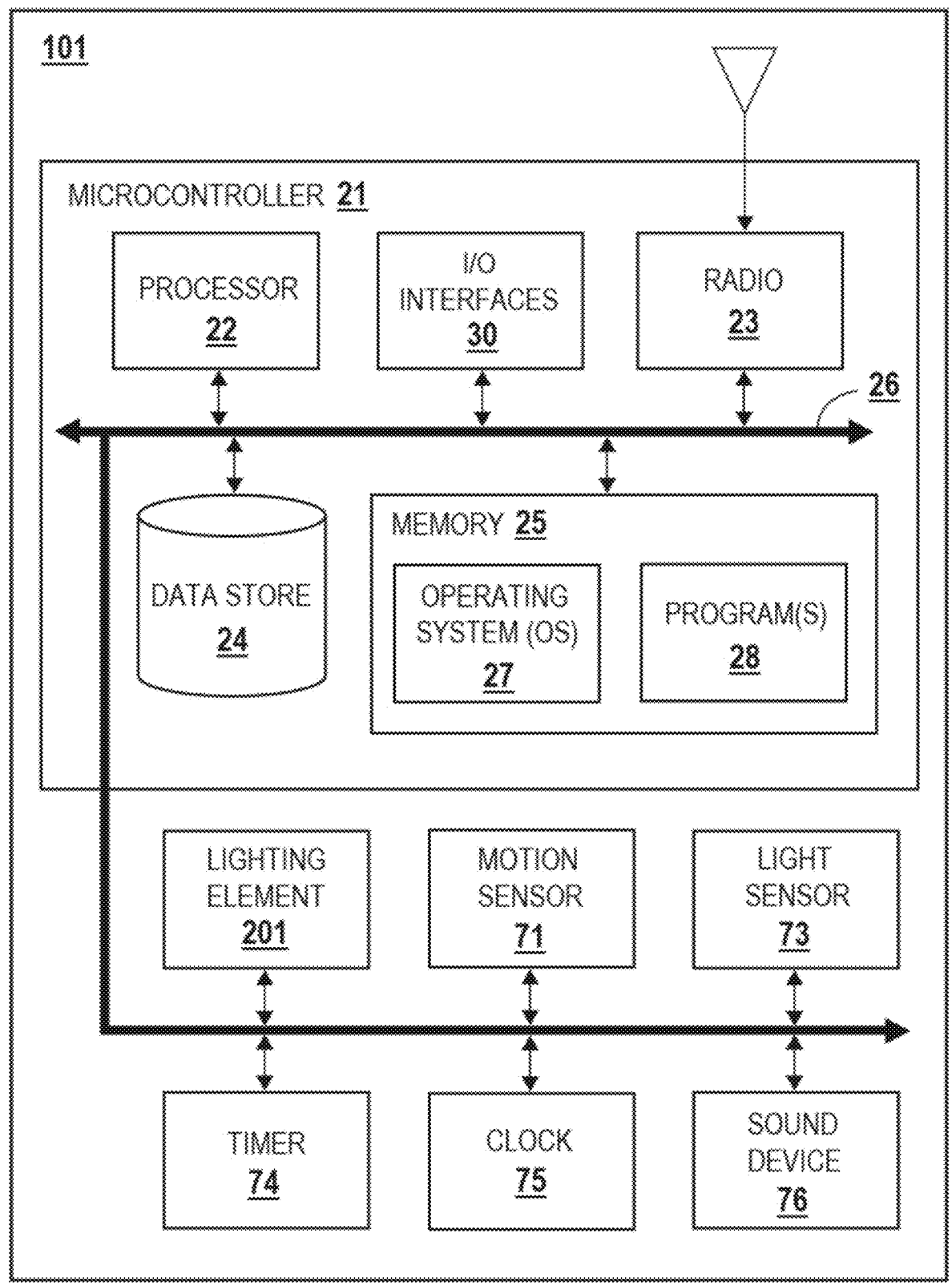
FIG. 16 depicts a block diagram of a further example of an apparatus for selectively interrupting the power supply of lighting elements according to various embodiments described herein.

FIG. 16 illustrates a block diagram showing some elements of another example of an apparatus for selectively interrupting the power supply of lighting elements 101 according to various embodiments described herein. In some embodiments, a system 100 may comprise one or more lighting elements 201, motion sensors 71, microcontrollers 22, light sensors 73, timers 74, clocks 75, sound devices 76, and/or manual switches 31 that may be integrated with an apparatus 100. In further embodiments, a system 100 may comprise one or more lighting elements 201, motion sensors 71, microcontrollers 22, light sensors 73, timers 74, clocks 75, sound devices 76, and/or manual switches 31 that may not be integrated with an apparatus 100 but which may be in wired or wireless communication with one or more apparatuses 101.

In some embodiments, the system 100 may comprise one or more motion sensors 71 which may be in communication with a microcontroller 22 of the system 100. A motion sensor 71 may comprise a passive infrared motion sensor, microwave motion sensor, ultrasonic motion sensor, tomographic motion sensor, video camera software, or any other type of sensor configured to detect motion in an area.

In some embodiments, the system 100 may comprise one or more light sensors 73 which may be in communication with a microcontroller 22 of the system 100. In preferred embodiments, a light sensor 73 may be or comprise a passive device that converts the light energy into an electrical signal output. Light sensors 73 are more commonly known as Photoelectric Devices or Photo Sensors because they convert light energy (photons) into electronic signal (electrons). A light sensor 73 may detect light levels via any suitable detection mechanism including: Photoemission or photoelectric effect; thermal; polarization; photochemical; and weak interaction effects. Example light sensors 73 include: Active-pixel sensors (APSs), Cadmium zinc telluride radiation detectors, Charge-coupled devices (CCD), HgCdTe infrared detectors, LEDs which are reverse-biased to act as photodiodes, Photoresistors or Light Dependent Resistors (LDR), Photodiodes which can operate in photovoltaic mode or photoconductive mode, Phototransistors, which act like amplifying photodiodes, Quantum dot photoconductors or photodiodes, and Photovoltaic cells or solar cells.

In some embodiments, the system 100 may comprise one or more timers 74 and/or clocks 75 which may be in communication with a microcontroller 22 of the system 100. Optionally, a timer 74 and/or a clock 75 may comprise a software program which may be run by an apparatus 101 or other element of the system 100. Generally, a timer 74 may count down a period of time and/or record a period of time, while a clock 75 may keep the current time and optionally date of the location that the system 100 may be operating in.

In some embodiments, the system 100 may comprise one or more sound devices 76 which may be in communication with a microcontroller 22 of the system 100. A sound device 76 may be used to produce a plurality of sounds at a plurality of volume levels. Preferably, a sound device 76 may be configured to produce sounds, such as an audio alert, which may be used to audibly appraise a user 300 of the status of one or more elements of the system 100 and/or of one or more conditions that the system 100 is in. A sound device 76 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds.

Figure 17:
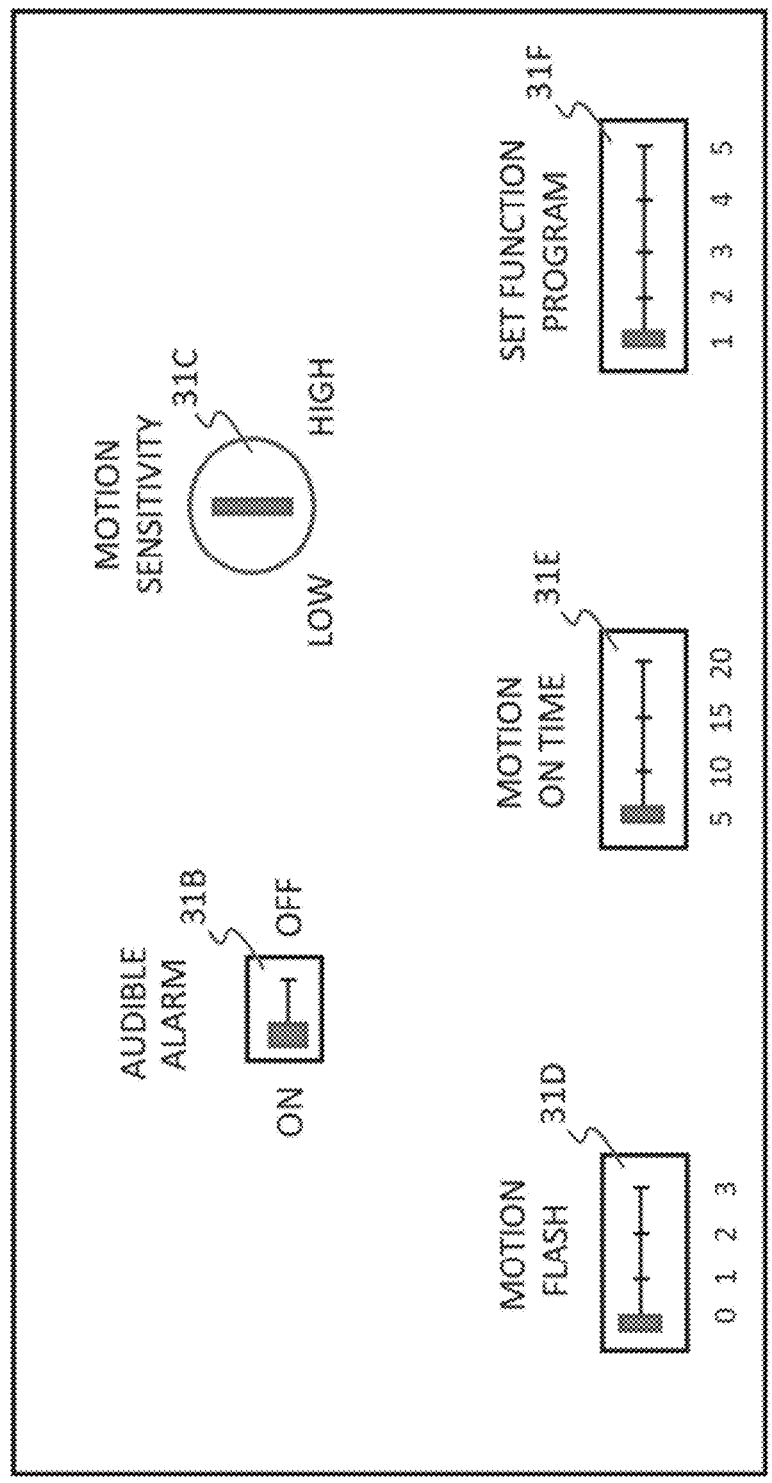
FIG. 17 illustrates some exemplary manual switches according to various embodiments described herein.

As shown in FIG. 17, the system 100 may comprise one or more manual switches 31 which may be in communication with a microcontroller 22 of the system 100. Optionally, one or more manual switches 31 may be integrated with a (I/O) interface 30, such as a sequence control module 42. Manual switches 31 may be configured by a user 300 to instruct the microcontroller 22 on different setting that a user 300 may desire. In preferred embodiments, a manual switch 31 may be set or otherwise manipulated by a user 300, and the manual switch 31 may select a set function program 82 that the microcontroller 22 may run during a nighttime period 501, 502, of a night period 500. In further embodiments, the system 100 may comprise: an audible alarm manual switch 31B that may be configured to turn on and off an audible alarm; a motion sensitivity manual switch 31C that may be configured to increase and decrease the motion sensitivity of one or more motion sensors 71; a motion flash manual switch 31D that may be configured to control the number of times a lighting element 201 flashes in response to motion being detected by one or more motion sensors 71; a motion on time manual switch 31E that may be configured to control how long a lighting element 201 remains illuminated to motion being detected by one or more motion sensors 71; a set function program manual switch 31F that may be configured to control which set function program 82 is to be run by a microcontroller 22; and/or any other type or functional manual switch.

Figure 18:
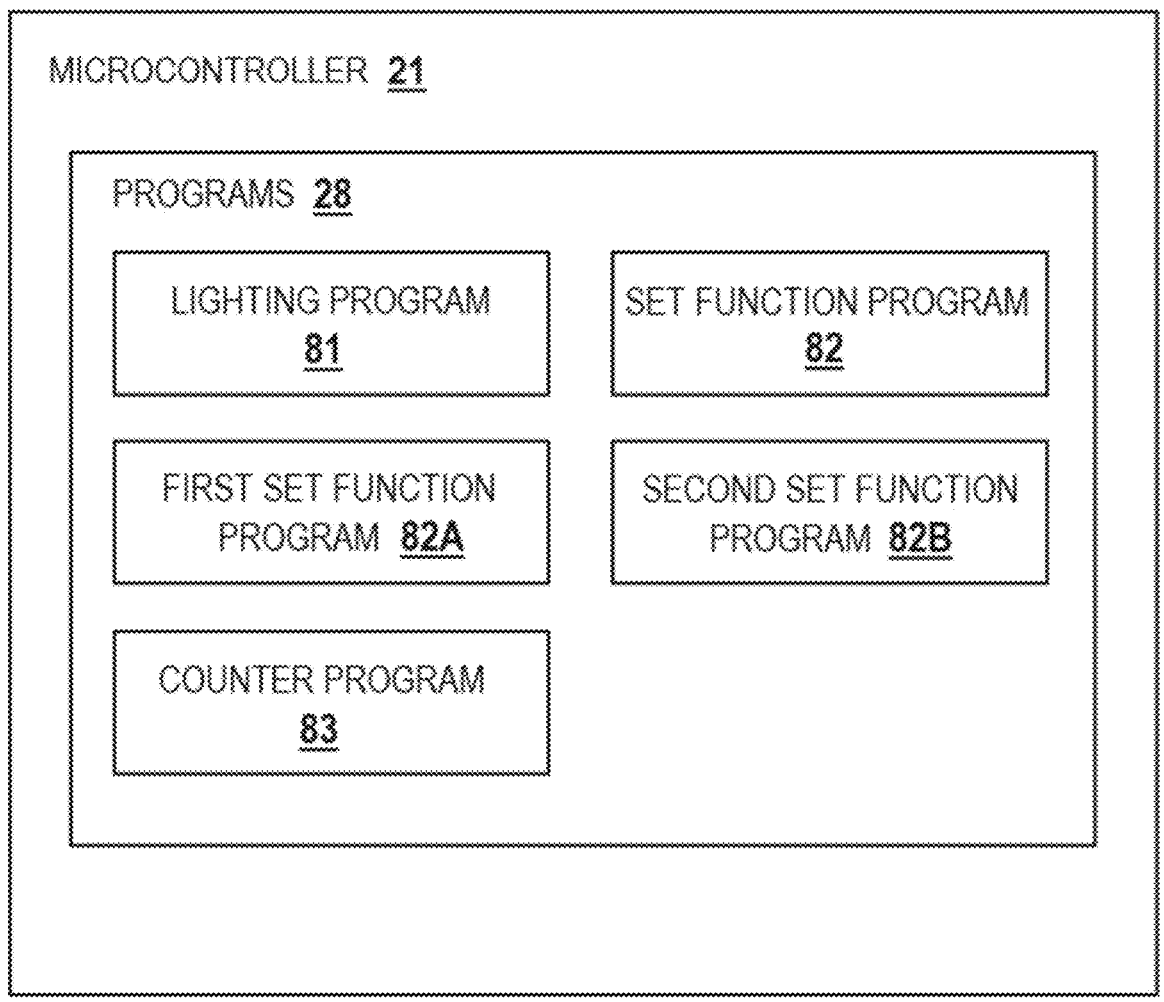
FIG. 18 shows a block diagram illustrating some programs of a system for selectively interrupting the power supply of lighting elements which may function as software rules engines according to various embodiments described herein.

FIG. 18 shows a block diagram illustrating some programs of a lighting system 100 which may function as software rules engines and which may optionally be configured to run on one or more apparatuses 101, servers 300, and/or client devices 400 of the system 100. In preferred embodiments, one or more apparatuses 101 may be configured to run one or more software rules engines or programs such as a lighting program 81, a set function program 82, and a counter program 83. It should be understood that the functions attributed to the programs 81, 82, 83, described herein are exemplary in nature, and that in alternative embodiments, any function attributed to any program 81, 82, 83, may be performed by one or more other programs 81, 82, 83, or any other suitable processor logic.

In some embodiments, the lighting program 81 may comprise or function as lighting logic stored in the memory 25 which may be executable by the processor 22 of an apparatus 101. The lighting program 81 be configured to control the power supplied to a lighting element 201 in order to cause the lighting element 201 to start and stop producing light. In further embodiments, a lighting program 81 may be configured to determine one or more time periods, such as a dusk time period 510, dawn time period 520, night period 530, and any number of nighttime periods 531, 532. In further embodiments, a lighting program 81 may be configured to run one or more set function programs 82. In still further embodiments, a lighting program 81 may be configured to function as a timer 74 and/or clock 75. In further embodiments, a lighting program 81 may be configured to receive and/or generate timer 74 and/or clock 75 data. In yet further embodiments, a lighting program 81 may be configured to detect the presence of motion via a motion sensor 71.

In some embodiments, the system 100 may comprise one or more set function programs 82 that may comprise or function as set function logic stored in the memory 25 which may be executable by the processor 22 of an apparatus 101. In some embodiments, a set function program 82 may be configured to cause a lighting element 201 to maintain or to enter an always on configuration and a motion activated on configuration. In further embodiments, a set function program 82 may be configured to cause a lighting element 201 to flash a pre-determined number of instances upon detecting motion (via the motion sensor 71) during one nighttime period but to not flash a pre-determined number of instances during another nighttime period. In further embodiments, a set function program 82 may be configured to cause an audible alarm to be played or generated by a sound device 76. In further preferred embodiments, a set function program 82 may comprise or be associated with a detection time window.

In some embodiments, the system 100 may comprise one or more counter programs 82 that may comprise or function as counter logic stored in the memory 25 which may be executable by the processor 22 of an apparatus 101. In some embodiments, a counter program 83 may be configured to determine the number of instances motion is detected, via a motion sensor 71 within a detection time window. In further embodiments, a counter program 83 may be configured to detect a number of motion detected instances greater than a set motion detection threshold value within a detection window.

Figure 19:
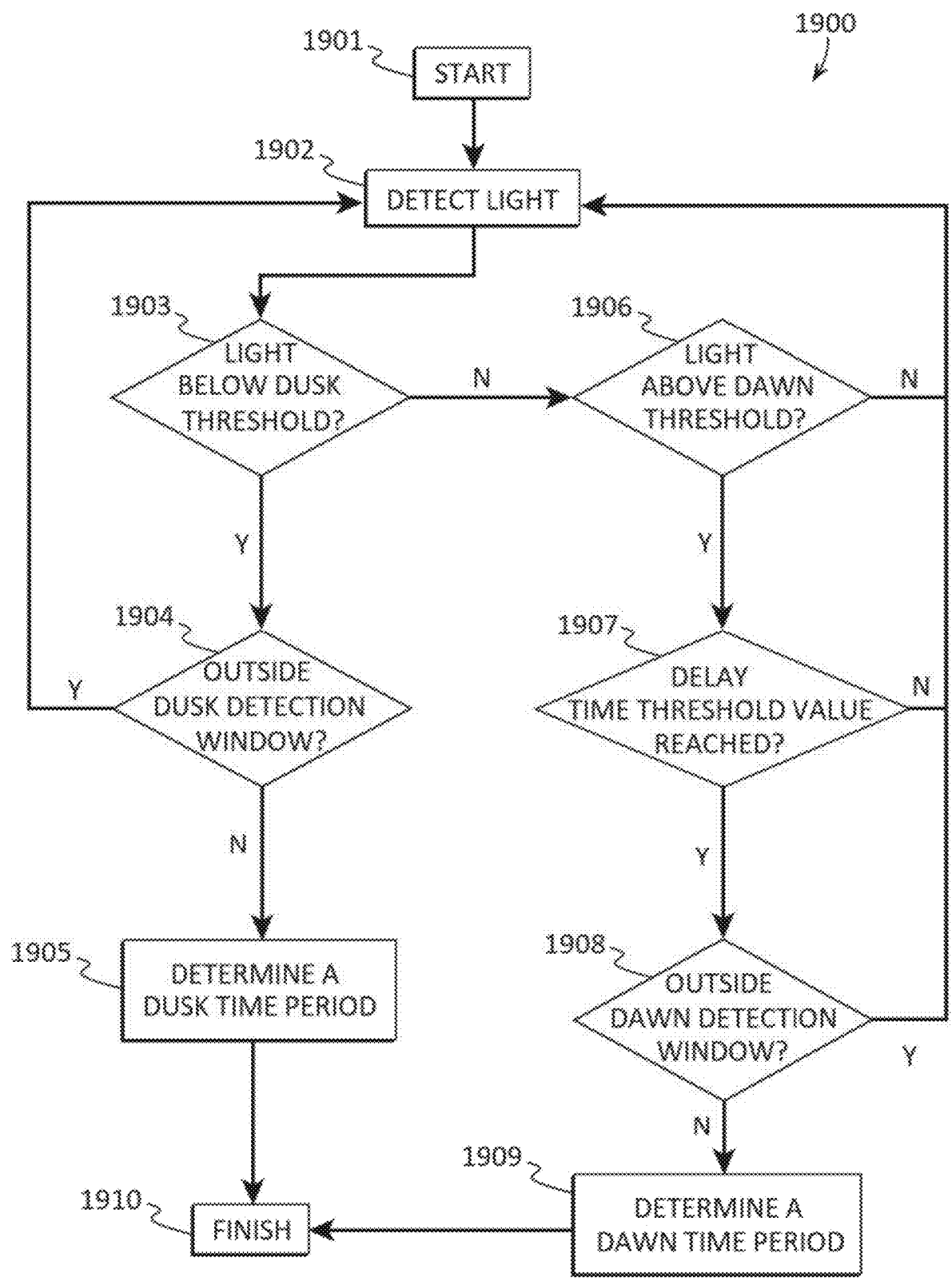
FIG. 19 depicts a block diagram of an example of a dusk and dawn detection method according to various embodiments described herein.
Figure 20:
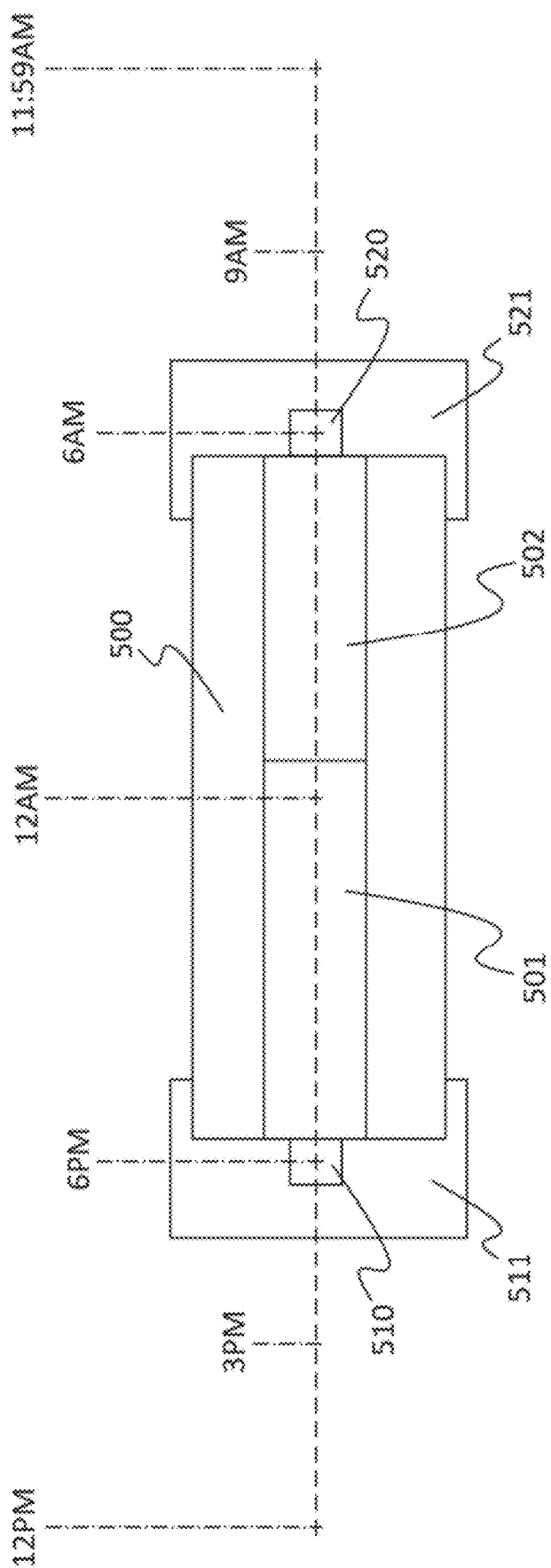
FIG. 20 illustrates a diagram showing some exemplary time periods according to various embodiments described herein.

FIG. 19 depicts a block diagram of an example of a computer-implemented dusk and dawn detection method ("the method") 1900 according to various embodiments described herein. In some embodiments, the method 1900 may be used to determine a dusk time period 510 and a dawn time period 520 for enabling the system 100 to selectively interrupt the power supply of a lighting element 201 to control the illumination of the lighting element 201 so that the lighting element 201 may illuminate differently during two or more time periods, preferably during the night or dark hours, some examples of which are depicted in FIG. 20. One or more steps of the method 1900 may be performed by a lighting program 81, one or more set function programs 82, and/or a counter program 83 which may be executed by a microcontroller 21 computing device processor, such as a processor 22 (FIG. 2).

The method 1900 may start 1901 and light may be detected by a lighting program 81 running on a microcontroller 22 via a light sensor 73 in step 1902. In decision block 1903, the lighting program 81 may determine if the light detected is below a dusk threshold. Generally, a dusk threshold may describe a light level detected by the light sensor 73 that indicates that daylight hours are ending or ended, such as at dusk or thereabouts. If the light detected is not below a dusk threshold, the method 1900 may proceed to decision block 1906. If the light detected is below a dusk threshold, the method 1900 may proceed to decision block 1904.

In decision block 1904, the lighting program 81 may determine if the time that the light detected that is below the dusk threshold is outside a dusk detection window 512. Preferably, the time data may be determined using a clock 75 and/or timer 74. A dusk detection window 512 may describe a time period at which dusk can occur. For example, dusk in Charlotte, N.C. cannot occur at 3 PM, but depending on the time of year can occur between a dusk detection window 512 from 5:45 to 6:15 PM. In some embodiments, a dusk detection window 512 for a desired geographical location may be programmed into the microcontroller 22 or communicated to the microcontroller 22 via a server 300 or client device 400. In further embodiments, a microcontroller 22 may determine a dusk detection window 512 by averaging the times at which light detected in step 1902 falls below a dusk threshold over a number of consecutive days. If the time that the light detected that is below the dusk threshold is outside a dusk detection window 512, the method may continue to step 1902. If the time that the light detected that is below the dusk threshold is not outside a dusk detection window 512, the method may continue to step 1905.

In step 1905, the lighting program 81 may determine a dusk time period 510 which may describe a time or time period that describes the time in the day at which dusk occurs using the light sensor 73 data and the time data of clock 75 and/or timer 74. In this manner, a light sensor 73 may detect a decrease of ambient light to determine the start of the dusk time period 510. In preferred embodiments, the lighting program 81 may determine a dusk time period 510 by averaging times at which light detected by the light sensor 73 falls below a dusk threshold over a number of consecutive days. In further preferred embodiments, the lighting program 81 may not average a time at which light detected by the light sensor 73 falls below a dusk threshold if the time is outside a dusk detection window 512 that includes at least one of the times at which light detected by the light sensor 73 fell below the dusk threshold over at least one day of the number of consecutive days. After step 1905, the method 1900 may finish 1910 or continue to step 1902.

In decision block 1906, the lighting program 81 may determine if the light detected exceeds or is above a dawn threshold. Generally, a dawn threshold may describe a light level detected by the light sensor 73 that indicates that daylight hours are staring or have begun, such as at dawn or thereabouts. If the light detected does not exceed a dawn threshold, the method 1900 may proceed to step 1902. If the light detected does not exceed a dawn threshold, the method 1900 may proceed to decision block 1907.

In decision block 1907, the lighting program 81 may determine if a delay time threshold value has been reached using time data from clock 75 and/or time 74. In preferred embodiments, a timer 74 may prevent the lighting element 201 from turning off until a delay time threshold value is reached. Generally, a delay time threshold value may comprise a period of time, such as one to 20 minutes, which the light detected by the light sensor 73 must remain above the dawn threshold. In this manner, the timer 74, via the microcontroller 22, may prevent the lighting element 201 from turning off or ceasing illumination by having a light, such as a flashlight, shine on the light sensor 73 for a relatively short period of time. If the delay time threshold value has not been reached, the method may continue to step 1902. If the delay time threshold value has been reached, the method 1900 may continue to step 1908.

In step 1908, the lighting program 81 may determine if the time that the light detected that is above the dawn threshold is outside a dawn detection window 522. Preferably, the time data may be determined using a clock 75 and/or timer 74. A dawn detection window 522 may describe a time period at which dawn can occur. For example, dawn in Charlotte, N.C. cannot occur at 3 AM, but depending on the time of year can occur between a dawn detection window 522 from 5:45 to 6:15 AM. In some embodiments, a dawn detection window 522 for a desired geographical location may be programmed into the microcontroller 22 or communicated to the microcontroller 22 via a server 300 or client device 400. In further embodiments, a microcontroller 22 may determine a dawn detection window 522 by averaging the times at which light detected in step 1902 exceeds or is above a dawn threshold over a number of consecutive days. If the time that the light detected that is below the dawn threshold is outside a dawn detection window 522, the method may continue to step 1902. If the time that the light detected that is below the dawn threshold is not outside a dawn detection window 522, the method may continue to step 1909.

In step 1909, the lighting program 81 may determine a dawn time period 520 which may describe a time or time period that describes the time in the day at which dawn occurs using the time data of clock 75 and/or timer 74. In preferred embodiments, the lighting program 81 may determine a dawn time period 520 by averaging times at which light detected by the light sensor 73 exceeds or is above a dawn threshold over a number of consecutive days. In further preferred embodiments, the lighting program 81 may not average a time at which light detected by the light sensor 73 exceeds or is above a dawn threshold if the time is outside a dawn detection window 522 that includes at least one of the times at which light detected by the light sensor 73 exceeds or is above a dawn threshold over at least one day of the number of consecutive days. After step 1909, the method 1900 may finish 1910 or continue to step 1902.

Figure 21:
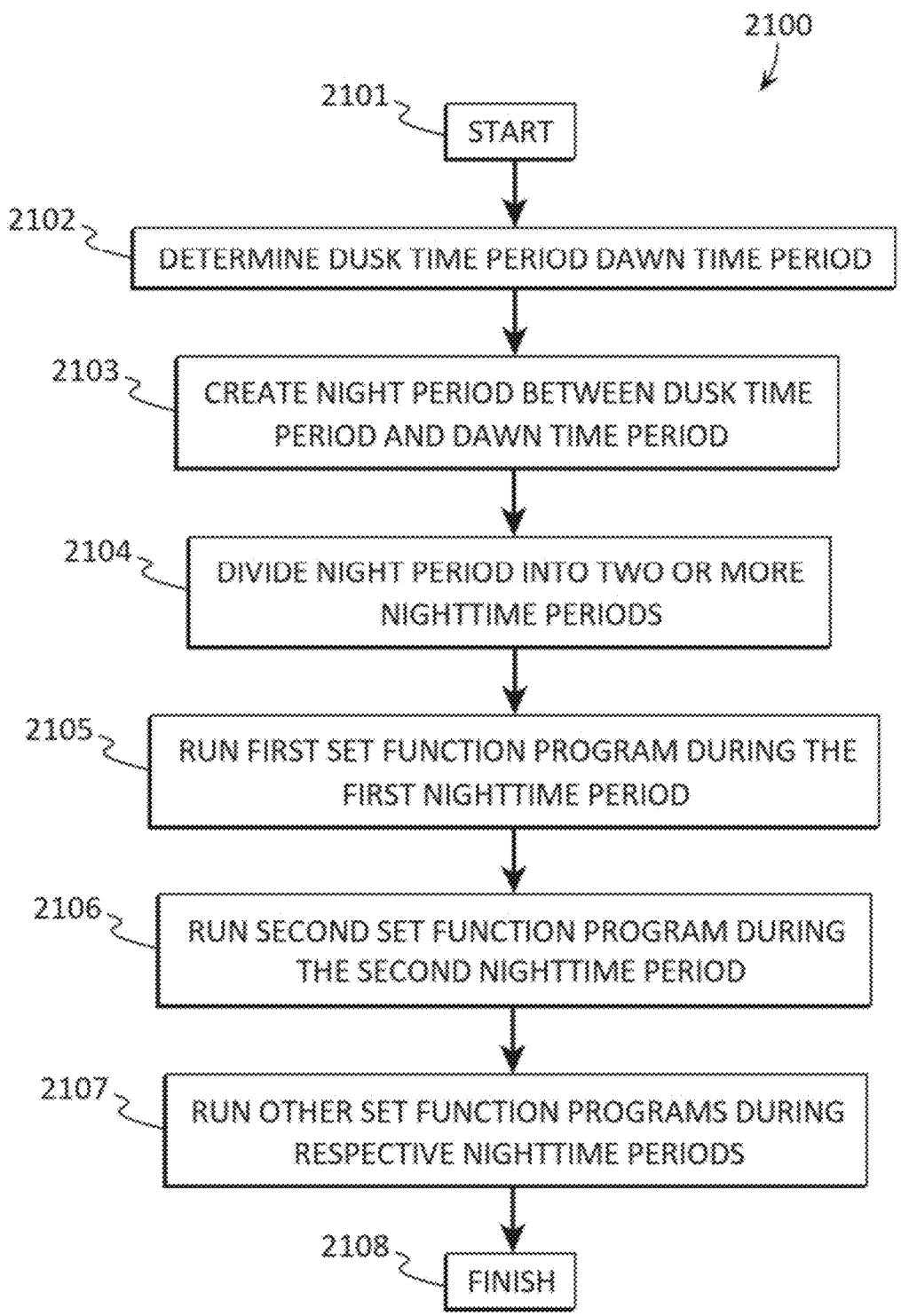
FIG. 21 shows a block diagram of an example of a security lighting method according to various embodiments described herein.

FIG. 21 shows a block diagram of an example of a computer-implemented security lighting method ("the method") 2100 according to various embodiments described herein. In some embodiments, the method 2100 may be used to selectively interrupting the power supply of a lighting element 201 to control the illumination of the lighting element 201 so that the lighting element 201 may illuminate differently during two or more time periods, preferably during the night or dark hours, some examples of which are depicted in FIG. 20. One or more steps of the method 2100 may be performed by a lighting program 81, one or more set function programs 82, and/or a counter program 83 which may be executed by a microcontroller 21 computing device processor, such as a processor 22 (FIG. 2).

The method 2100 may start 2101 and a dusk time period 510 and a dawn time period 520 may be determined by a lighting program 81 running on a microcontroller 22 via a light sensor 73, timer 74, clock 75, and/or any other elements of the system 100 in step 2102 according to method 1900.

In step 2103, the lighting program 81 may create a night period 500 between the dusk time period 510 and the dawn time period 520. Generally, a night period 500 may describe the period of time between dusk and dawn for a geographical location. For example, if a dusk time period 510 is 6 PM and a dawn time period 520 is 6 AM, then the night period 500 may be between 6 PM and 6 AM.

In step 2104, the lighting program 81 may divide the night period 500 into two or more nighttime periods 501, 502. While in some embodiments and in the example of FIG. 20, the night period 500 is divided into a first nighttime period 501 and a second nighttime period 502, in other embodiments, the night period 500 may be divided into three, four, five, six, seven, eight, or more, such as a plurality of nighttime periods 501, 502. It should also be understood that nighttime periods 501, 502, may be of any length. For example, a first nighttime period 501 may be approximately four hours and a second nighttime period 502 may be approximately eight hours for a twelve hour night period 500.

In steps 2105 and 2106, the lighting program 81 may run a set function program 82 during each nighttime period 501, 502. The lighting program 81 may use time data from a timer 74 and/or clock 75 to determine when to run each set function program 82. Also, while the example of FIG. 20 has two nighttime periods 501, 502, and therefore results in the running of two set function programs 82A, 82B, other embodiments having three, four, five, six, seven, or more nighttime periods 501, 502, may result in the running of three, four, five, six, seven, or more set function programs 82.

In preferred embodiments, two sequential set function programs 82 may have different instructions for operation of a lighting element 201, sound device 76, and/or other element so that the lighting element 201 may function differently during a second nighttime period 502 than during a first nighttime period 501. For example, using the instructions of a first 82A and second 82B set function program, a lighting program 81 may be configured to play an audible alarm, via a sound device 76, upon the detection of motion, via a motion sensor 71, while running the second set function program 82B while not playing an audible alarm upon the detection of motion while running the first set function program 82A. In other embodiments, two sequential set function programs 82 may have the same instructions for operation of a lighting element 201, sound device 76, and/or other element.

In step 2105, the lighting program 81 may run a first set function program 82A during the first nighttime period 501. In preferred embodiments, a timer 74 and/or a clock 75 may be used by the microcontroller 22 to determine the start of the first nighttime period 501. In other embodiments, one or more manual switches 31, such as a set function program manual switch 31F, may be set by a user 300, and the manual switch 31 may select a set function program 82 to run during a nighttime time period, such as a first night time period 82A and a second night time period 82B. In still other embodiments, a user 300 or other entity may select a set function program 82 to run during a nighttime time period 501, 502, via a client device 400, server 300, or other computing device.

In some embodiments, a first set function program 82A may be configured to cause a lighting element 201 to maintain or to enter an always ON configuration, a motion activated on configuration, and/or any other configuration. In further embodiments, a first set function program 82A may be configured to cause a lighting element 201 to flash a pre-determined number of instances upon detecting motion (via the motion sensor 71) during its respective first nighttime period 501 or to not flash a pre-determined number of instances its respective first nighttime period 501. In further embodiments, a set function program 82 may be configured to cause an audible alarm to be played or generated by a sound device 76 optionally during and/or after one or more instances of motion are detected by a motion sensor 71 in addition to or in place of flashing the lighting element 201.

In step 2106, the lighting program 81 may run a second set function program 82B during the second nighttime period 502. In preferred embodiments, a timer 74 and/or a clock 75 may be used by the microcontroller 22 to determine the start of the second nighttime period 502. In other embodiments, one or more manual switches 31, such as a set function program manual switch 31F, may be set by a user 300, and the manual switch 31 may select a set function program 82 to run during a nighttime time period, such as a first night time period 82A and a second night time period 82B. In still other embodiments, a user 300 or other entity may select a set function program 82 to run during a nighttime time period 501, 502, via a client device 400, server 300, or other computing device.

In some embodiments, a second set function program 82B may be configured to cause a lighting element 201 to maintain or to enter an always on configuration, a motion activated on configuration, and/or any other configuration. In further embodiments, a second set function program 82B may be configured to cause a lighting element 201 to flash a pre-determined number of instances upon detecting motion (via the motion sensor 71) during its respective second nighttime period 502 or to not flash a pre-determined number of instances its respective second nighttime period 502. In further embodiments, a set function program 82 may be configured to cause an audible alarm to be played or generated by a sound device 76 optionally during and/or after one or more instances of motion are detected by a motion sensor 71 in addition to or in place of flashing the lighting element 201.

Next in optional step 2107, the lighting program 81 may run any other set function programs 82 during the respective or corresponding nighttime periods 501, 502, if system 100 has any other set function programs 82. After step 2107, the method 2100 may finish 2108. In preferred embodiments, the method 2100 may finish 2108 at a dawn time period 520 which may be determined via the dawn time period determination 1909 of method 1900 optionally using data from a light sensor 73 and or a timer 74 and/or clock 75.

Figure 22:
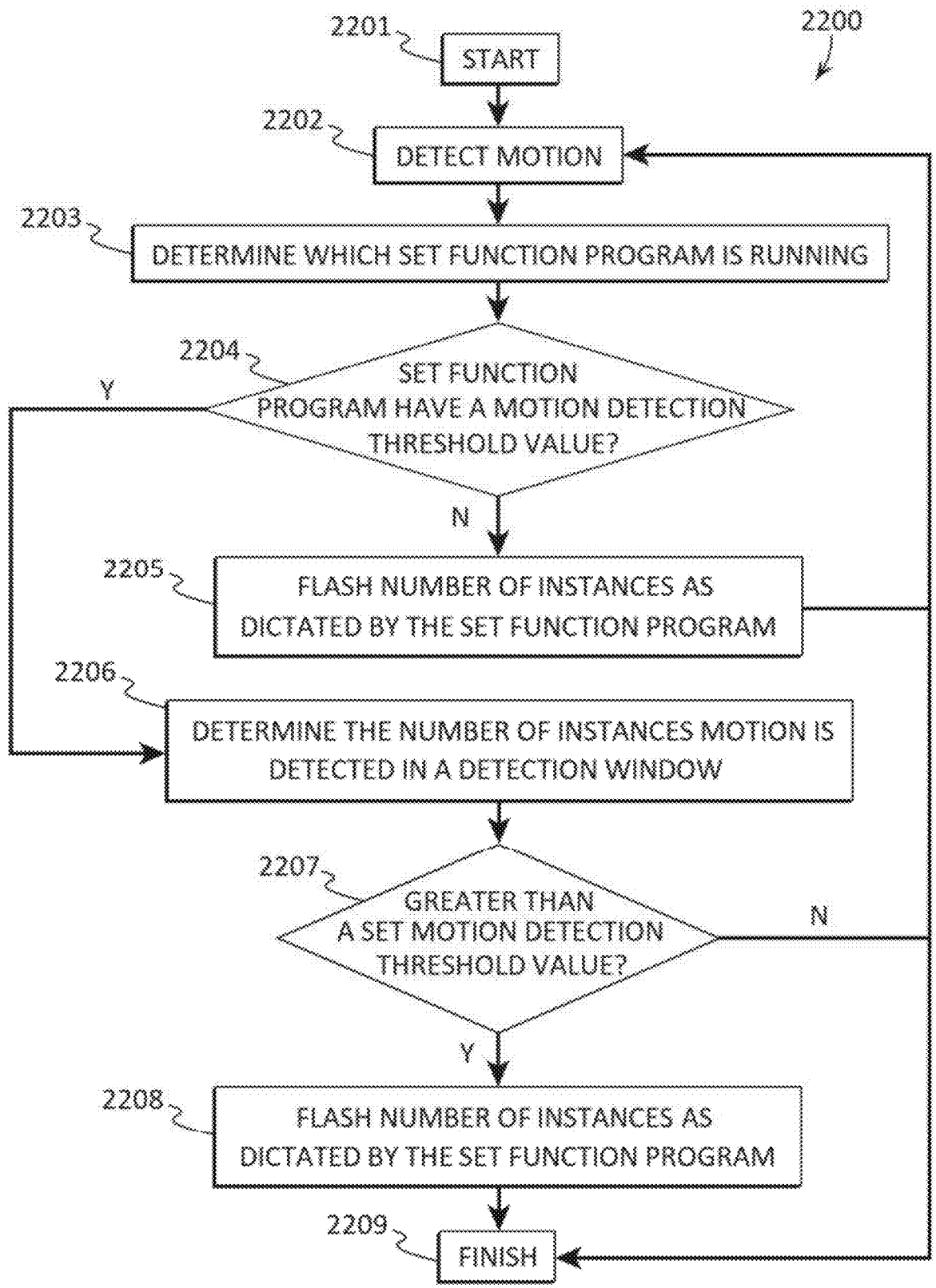
FIG. 22 depicts a block diagram of an example of a security lighting alert method according to various embodiments described herein.

FIG. 22 depicts a block diagram of an example of a computer-implemented security lighting alert method ("the method") 2200 according to various embodiments described herein. In some embodiments, the method 2200 may be used to selectively interrupting the power supply of a lighting element 201 to control the illumination of the lighting element 201 and other elements of the system 100 so that one or more users 300 may be alerted or appraised upon detection of motion by a motion sensor 71, preferably during the night or dark hours, some examples of which are depicted in FIG. 20. One or more steps of the method 2200 may be performed by a lighting program 81, one or more set function programs 82, and/or a counter program 83 which may be executed by a microcontroller 21 computing device processor, such as a processor 22 (FIG. 2).

The method 2200 may start 2201 and the lighting program 81 of a microcontroller 22 may detect motion via a motion sensor 71 in step 2202.

Next in step 2203, the lighting program 81 may determine which set function program 82 is running. In some embodiments, the lighting program 81 may determine which set function program 82 is running by receiving data from a timer 74 and/or clock 75 and comparing it to the run times of the nighttime period 501 associated with the set function program 82. In other embodiments, the lighting program 81 may determine which set function program 82 is running via one or more manual switches 31. Preferably, a set function program 82 may comprise or be associated with a set motion detection threshold value and a detection window. Optionally, the set motion detection threshold value and detection window of a set function program 82 may be associated with a number of instances that a lighting element 201 is to flash upon the number of instances motion detected within the detection time window is greater than the set motion detection threshold value. In some embodiments, a set motion detection threshold value may describe a number of instances motion is detected by a motion sensor 71 in a detection time window. In some embodiments, a detection time window may comprise a nighttime period 501, 502. For example, a set motion detection threshold value may five instances motion detected by a motion sensor 71 in a detection time window that is a nighttime period 501, 502. In other embodiments, a detection time window may comprise a time interval of a nighttime period 501, 502. For example, a set motion detection threshold value may three instances motion detected by a motion sensor 71 in a detection time window that is any fifteen minute interval of a nighttime period 501, 502.

In decision block 2204, the lighting program 81 may determine if the set function program 82 that is running has a set motion detection threshold value. If the set function program 82 that is running does not have a set motion detection threshold value, the method 2200 may continue to step 2205. If the set function program 82 that is running does have a set motion detection threshold value, the method 2200 may continue to step 2206.

In step 2205, the lighting program 81 and/or set function program 82 that is running may selectively interrupting the power supply of a lighting element 201 to cause the lighting element 201 to flash a number of instances as dictated by the set function program 82. In further preferred embodiments, the lighting program 81 and/or set function program 82 that is running may cause the lighting element 201 to flash a number of instances; to then cause the lighting element 201 to turn ON for a length of time; and/or to preferably cause a sound device 76 to generate an audible alarm preferably as dictated by the set function program 82. After step 2205, the method 200 may continue to step 2202.

In step 2206, the lighting program 81 and/or a counter program 83 may determine the number of instances motion is detected in a detection window of the running set function program 82. In preferred embodiments, a counter program 83 may determine the number of instances motion is detected via data provided by a motion sensor 71 in a detection window provided by time data by a timer 74 and/or clock 75.

Next in decision block 2207, the lighting program 81 and/or counter program 83 may determine if the number of instances motion is detected in a detection window of the running set function program 82 is greater than the set motion detection threshold value of the running set function program 82. If the number of instances motion is detected in a detection window of the running set function program 82 is not greater than the set motion detection threshold value of the running set function program 82, the method 2200 may continue to step 2202. If the number of instances motion is detected in a detection window of the running set function program 82 is greater than the set motion detection threshold value of the running set function program 82, then the method 2200 may proceed to step 2208.

In step 2208, the lighting program 81 and/or set function program 82 that is running may selectively interrupting the power supply of a lighting element 201 to cause the lighting element 201 to flash a number of instances as dictated by the set function program 82. In further preferred embodiments, the lighting program 81 and/or set function program 82 that is running may cause the lighting element 201 to flash a number of instances; to then cause the lighting element 201 to turn ON for a length of time; and/or to preferably cause a sound device 76 to generate an audible alarm preferably as dictated by the set function program 82. After step 2208, the method 2200 may finish 2209 or continue to step 2202.

Figure 23:
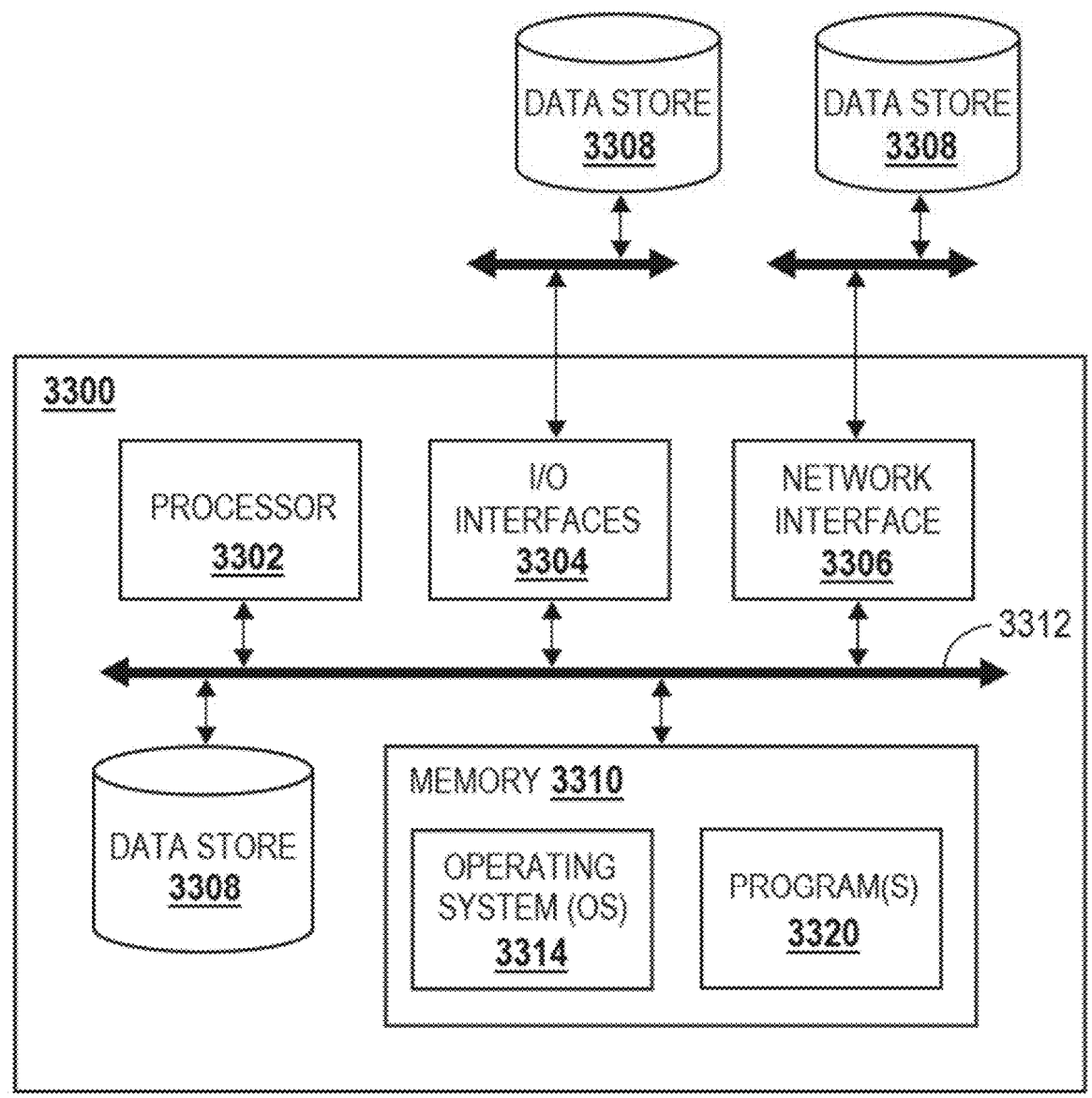
FIG. 23 shows an example of a block diagram of a server which may be used in the system or standalone according to various embodiments described herein.

Referring to FIG. 23, in an exemplary embodiment, a block diagram illustrates a server 3300 which may be used in the system 100, in other systems, or standalone. The server 3300 may be a digital computer that, in terms of hardware architecture, generally includes a processor 3302, input/output (I/O) interfaces 3304, a network interface 3306, a data store 3308, and memory 3310. It should be appreciated by those of ordinary skill in the art that FIG. 23 depicts the server 3300 in an oversimplified manner, and a practical embodiment may include additional components and suitably configured processing logic to support known or conventional operating features that are not described in detail herein. The components (3302, 3304, 3306, 3308, and 3310) are communicatively coupled via a local interface 3312. The local interface 3312 may be, for example but not limited to, one or more buses or other wired or wireless connections, as is known in the art. The local interface 3312 may have additional elements, which are omitted for simplicity, such as controllers, buffers (caches), drivers, repeaters, and receivers, among many others, to enable communications. Further, the local interface 3312 may include address, control, and/or data connections to enable appropriate communications among the aforementioned components.

The processor 3302 is a hardware device for executing software instructions. The processor 3302 may be any custom made or commercially available processor, a central processing unit (CPU), an auxiliary processor among several processors associated with the server 3300, a semiconductor-based microprocessor (in the form of a microchip or chip set), or generally any device for executing software instructions. When the server 3300 is in operation, the processor 3302 is configured to execute software stored within the memory 3310, to communicate data to and from the memory 3310, and to generally control operations of the server 3300 pursuant to the software instructions. The I/O interfaces 3304 may be used to receive user input from and/or for providing system output to one or more devices or components. User input may be provided via, for example, a keyboard, touch pad, and/or a mouse. System output may be provided via a display device and a printer (not shown). I/O interfaces 3304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 3306 may be used to enable the server 3300 to communicate on a network, such as the Internet, a wide area network (WAN), a local area network (LAN), and the like, etc. The network interface 3306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 3306 may include address, control, and/or data connections to enable appropriate communications on the network. A data store 3308 may be used to store data. The data store 3308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 3308 may incorporate electronic, magnetic, optical, and/or other types of storage media. In one example, the data store 3308 may be located internal to the server 3300 such as, for example, an internal hard drive connected to the local interface 3312 in the server 3300. Additionally, in another embodiment, the data store 3308 may be located external to the server 3300 such as, for example, an external hard drive connected to the I/O interfaces 3304 (e.g., SCSI or USB connection). In a further embodiment, the data store 3308 may be connected to the server 3300 through a network, such as, for example, a network attached file server.

The memory 3310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 3310 may incorporate electronic, magnetic, optical, and/or other types of storage media. Note that the memory 3310 may have a distributed architecture, where various components are situated remotely from one another, but can be accessed by the processor 3302. The software in memory 3310 may include one or more software programs, each of which includes an ordered listing of executable instructions for implementing logical functions. The software in the memory 3310 includes a suitable operating system (O/S) 3314 and one or more programs 3320. The operating system 3314 essentially controls the execution of other computer programs, such as the one or more programs 3320, and provides scheduling, input-output control, file and data management, memory management, and communication control and related services. The one or more programs 3320 may be configured to implement the various processes, algorithms, methods, techniques, etc. described herein.

Figure 24:
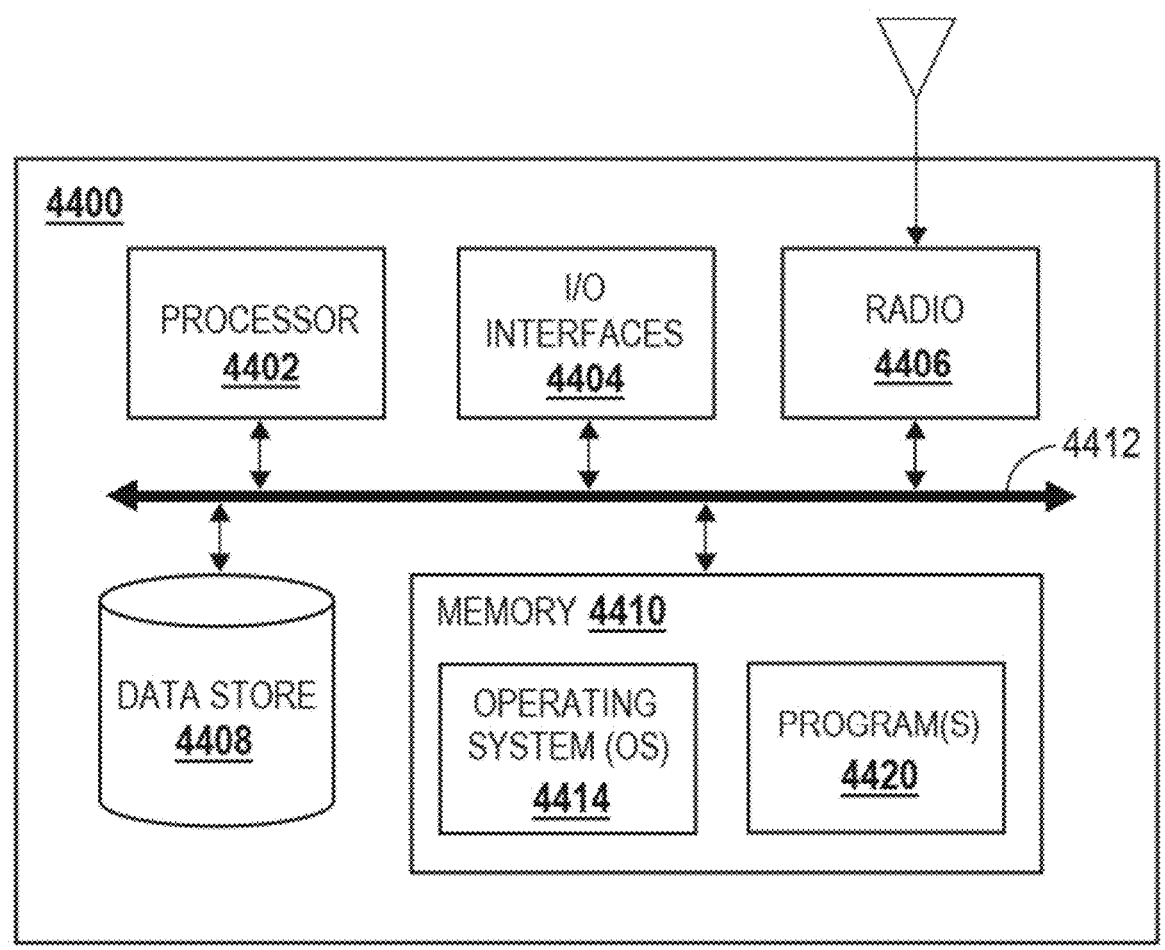
FIG. 24 shows an example of a block diagram of an electronic device according to various embodiments described herein.

Referring to FIG. 24, in an exemplary embodiment, a block diagram illustrates a client device 4400, which may be used in the system 100 or the like. The term "electronic device" as used herein is a type of electronic device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include; personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include; cell phones, smart phones, tablet computers, laptop computers, wearable computers such as watches, Google Glasses, etc. and the like.

The client device 4400 can be a digital device that, in terms of hardware architecture, generally includes a processor 4402, input/output (I/O) interfaces 4404, a radio 4406, a data store 4408, and memory 4410. It should be appreciated by those of ordinary skill in the art that FIG. 24 depicts the client device 4400 in an oversimplified manner, and a practical embodiment may include additional components and suitably configured processing logic to support known or conventional operating features that are not described in detail herein. The components (4402, 4404, 4406, 4408, and 4410) are communicatively coupled via a local interface 4412. The local interface 4412 can be, for example but not limited to, one or more buses or other wired or wireless connections, as is known in the art. The local interface 4412 can have additional elements, which are omitted for simplicity, such as controllers, buffers (caches), drivers, repeaters, and receivers, among many others, to enable communications. Further, the local interface 4412 may include address, control, and/or data connections to enable appropriate communications among the aforementioned components.

The processor 4402 is a hardware device for executing software instructions. The processor 4402 can be any custom made or commercially available processor, a central processing unit (CPU), an auxiliary processor among several processors associated with the client device 4400, a semiconductor-based microprocessor (in the form of a microchip or chip set), or generally any device for executing software instructions. When the client device 4400 is in operation, the processor 4402 is configured to execute software stored within the memory 4410, to communicate data to and from the memory 4410, and to generally control operations of the client device 4400 pursuant to the software instructions. In an exemplary embodiment, the processor 4402 may include a mobile optimized processor such as optimized for power consumption and mobile applications. The I/O interfaces 4404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 4404 can also include, for example, a serial port, a parallel port, a small computer system interface (SCSI), an infrared (IR) interface, a radio frequency (RF) interface, a universal serial bus (USB) interface, and the like. The I/O interfaces 4404 can include a graphical user interface (GUI) that enables a user to interact with the client device 4400. Additionally, the I/O interfaces 4404 may further include an imaging device, i.e. camera, video camera, etc.

The radio 4406 enables wireless communication to an external access device or network. Any number of suitable wireless data communication protocols, techniques, or methodologies can be supported by the radio 4406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 4408 may be used to store data. The data store 4408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 4408 may incorporate electronic, magnetic, optical, and/or other types of storage media.

The memory 4410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 4410 may incorporate electronic, magnetic, optical, and/or other types of storage media. Note that the memory 4410 may have a distributed architecture, where various components are situated remotely from one another, but can be accessed by the processor 4402. The software in memory 4410 can include one or more software programs, each of which includes an ordered listing of executable instructions for implementing logical functions. In the example of FIG. 24, the software in the memory 4410 includes a suitable operating system (O/S) 4414 and programs 4420. The operating system 4414 essentially controls the execution of other computer programs, and provides scheduling, input-output control, file and data management, memory management, and communication control and related services. The programs 4420 may include various applications, add-ons, etc. configured to provide end user functionality with the client device 4400. For example, exemplary programs 4420 may include, but not limited to, a web browser, social networking applications, streaming media applications, games, mapping and location applications, electronic mail applications, financial applications, and the like. In a typical example, the end user typically uses one or more of the programs 4420 along with a network such as the system 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A lighting program running on a microcontroller, the lighting program;
   determining from input received from a manual switch a set function program to run during a time period selected from a first nighttime period and a second nighttime period;
   detecting the presence of motion from a motion sensor;
   causing a lighting element to light a first number of instances if the lighting program is running in a first set function program during the first nighttime period and causing the lighting element to light a second number of instances if the lighting program is running in a second set function program during the second nighttime period; and
   wherein the first number of instances is not equal to the second number of instances.

2. The lighting program of claim 1, further comprising the step of playing an audible alarm upon the detection of motion while running the second set function program while not playing an audible alarm upon the detection of motion while running the first set function program.

3. The lighting program of claim 1, wherein the start of the first set function program is determined by one of: a light sensor, a timer, and a clock.

4. The progressive lighting program of claim 3, wherein the start of the second set function program is determined by one of: a timer and a clock.

5. The lighting program of claim 1, wherein a counter program determines a number of instances motion is detected within a detection time window.

6. The lighting program of claim 5, wherein the lighting element flashes when the counter program detects a number of motion detected instances greater than a set motion detection threshold value.

7. The lighting program of claim 1, wherein a light sensor detects the presence of light and a timer prevents the lighting element from turning off until a delay time threshold value is reached.

8. The lighting program of claim 1, wherein the lighting program determines a dusk time period by averaging times at which light detected by a light sensor falls below a dusk threshold over a number of consecutive days, and wherein the lighting program does not average a time at which light detected by the light sensor falls below a dusk threshold if the time is outside a dusk detection window that includes at least one of the times at which light detected by the light sensor fell below the dusk threshold over at least one day of the number of consecutive days.

9. The lighting program of claim 1, wherein the lighting program determines a dawn time period by averaging times at which light detected by a light sensor exceeds a dawn threshold over a number of consecutive days, and wherein the lighting program does not average a time at which light detected by the light sensor exceeds the dawn threshold if the time is outside a dawn detection window that includes at least one of the times at which light detected by the light sensor exceeded the dawn threshold over at least one day of the number of consecutive days.

* * * * *